US007589727B2

(12) United States Patent
Haeker

(10) Patent No.: US 7,589,727 B2
(45) Date of Patent: Sep. 15, 2009

(54) METHOD AND APPARATUS FOR GENERATING VISUAL IMAGES BASED ON MUSICAL COMPOSITIONS

(76) Inventor: Eric P. Haeker, 6012 Drexel Rd., Philadelphia, PA (US) 19131

( * ) Notice: Subject to any disclaimer, the term of this patent is extended or adjusted under 35 U.S.C. 154(b) by 336 days.

(21) Appl. No.: 11/334,029

(22) Filed: Jan. 18, 2006

(65) Prior Publication Data

US 2006/0156906 A1 Jul. 20, 2006

Related U.S. Application Data

(60) Provisional application No. 60/644,630, filed on Jan. 18, 2005.

(51) Int. Cl.
*G06T 15/00* (2006.01)

(52) U.S. Cl. ........................................ 345/440; 84/609

(58) Field of Classification Search ...................... None
See application file for complete search history.

(56) References Cited

U.S. PATENT DOCUMENTS 3,604,852 A 9/1971 Weintraub ................ 179/1 VS
3,698,277 A 10/1972 Barra .......................... 84/483
3,769,872 A 11/1973 Andrews ..................... 84/470
4,603,386 A 7/1986 Kjaer ......................... 364/419
4,664,010 A 5/1987 Sestero ....................... 84/1.01
4,884,972 A * 12/1989 Gasper ....................... 434/185
4,960,031 A 10/1990 Farrand ....................... 84/609
5,005,459 A * 4/1991 Adachi et al. ................. 84/453
5,088,380 A * 2/1992 Minamitaka ................. 84/637
5,146,833 A 9/1992 Lui ............................. 84/462
5,191,319 A 3/1993 Kiltz .......................... 340/701
5,496,179 A * 3/1996 Hoffman ..................... 434/433
5,513,129 A * 4/1996 Bolas et al. ................... 703/13
5,521,324 A * 5/1996 Dannenberg et al. .......... 84/612
5,525,749 A 6/1996 Aoki ........................... 84/609
5,602,356 A * 2/1997 Mohrbacher ................. 84/609
5,663,517 A 9/1997 Oppenheim .................. 84/649
5,679,913 A * 10/1997 Bruti et al. .................... 84/609
5,690,496 A * 11/1997 Kennedy ................ 434/307 R
5,728,960 A 3/1998 Sitrick ...................... 84/477 R
5,792,971 A * 8/1998 Timis et al. ................... 84/609
5,902,949 A * 5/1999 Mohrbacher ................. 84/609
6,127,616 A 10/2000 Yu ............................ 84/483.2
6,143,973 A * 11/2000 Kikuchi ....................... 84/645

(Continued)

FOREIGN PATENT DOCUMENTS

JP 11-224084 8/1999

(Continued)

OTHER PUBLICATIONS

Tadamura et al. Synchronizing Computer Graphics Animation and Audio. IEEE. 1998.*

(Continued)

*Primary Examiner*—Peter-Anthony Pappas
(74) *Attorney, Agent, or Firm*—Theodore Naccarella; Saul Ewing LLP

(57) ABSTRACT

The present invention generates 3D moving images representing various aspects of a musical performance that can be synchronized, as necessary, to the changing tempo of a live or recorded performance, either automatically, or with live-controlled user input, and either with or without a score.

33 Claims, 12 Drawing Sheets

U.S. PATENT DOCUMENTS

| | | | | |
|---|---|---|---|---|
| 6,160,558 | A * | 12/2000 | Motegi | 345/473 |
| 6,163,323 | A * | 12/2000 | Intriligator | 345/473 |
| 6,169,239 | B1 | 1/2001 | Aiardo | 84/483.2 |
| 6,245,982 | B1 * | 6/2001 | Suzuki et al. | 84/477 R |
| 6,310,279 | B1 | 10/2001 | Suzuki et al. | 84/600 |
| 6,353,170 | B1 * | 3/2002 | Eyzaguirre et al. | 84/603 |
| 6,411,289 | B1 | 6/2002 | Zimmerman | 345/302 |
| 6,429,863 | B1 * | 8/2002 | LoPiccolo et al. | 345/419 |
| 6,686,529 | B2 | 2/2004 | Kim | 84/464 R |
| 6,791,568 | B2 | 9/2004 | Steinberg et al. | 345/600 |
| 6,831,220 | B2 | 12/2004 | Varme | 84/483.2 |
| 6,898,759 | B1 | 5/2005 | Terada et al. | 715/500.1 |
| 6,927,331 | B2 | 8/2005 | Haase | 84/464 R |
| 6,972,363 | B2 * | 12/2005 | Georges et al. | 84/609 |
| 7,098,906 | B2 * | 8/2006 | Ibe et al. | 345/418 |
| 7,116,328 | B2 * | 10/2006 | Kawai et al. | 345/473 |
| 7,164,076 | B2 * | 1/2007 | McHale et al. | 84/616 |
| 2003/0103076 | A1 * | 6/2003 | Neuman | 345/723 |
| 2004/0200335 | A1 * | 10/2004 | Phillips | 84/483.2 |
| 2005/0190199 | A1 | 9/2005 | Brown et al. | 345/600 |
| 2007/0000374 | A1 * | 1/2007 | Clark et al. | 84/724 |
| 2008/0017017 | A1 * | 1/2008 | Zhu | 84/609 |

FOREIGN PATENT DOCUMENTS

| | | |
|---|---|---|
| WO | 2006/078597 | 7/2006 |

OTHER PUBLICATIONS

"Classical Concert pulls off visuals" Jan. 20, 2004 www.philly.com.

Arts in motion http://www.artsinmotion.org Dec. 19, 2005 pp. 1-3.

The Sound Studio, Sixth Edition, 1995 Alec Nisbett pp. 14-16.

Computer-Music Interfaces: A Survey Bruce W. Pennycook Computing Surveys, vol. 17, No. 2, Jun. 1985 pp. 267-289.

Stephen Malinowski, The Music Animation Machine, Software Application as Described and Downloaded at URL: <http://www.well.com/user/smalin/mam.html>, Downloaded on Jun. 30, 2000, pp. 1-28, Jul. 1993.

Stephen Malinowski, Music Animation Machine User Guide, pp. 1-29, Oct. 1994.

International Search Report for International application No. PCT/US06/01480 dated Apr. 10, 2008.

* cited by examiner

ARCHIVES

1st Movement
(116 Measures; 13,920 Frames)

2/4 time at 60 beats-per-minute

- 2 beats per measure
- Quarter note (♩) gets the beat
- ♩ = 1 second
- ♩ = 60 Frames (1 Measure = 120 Frames)

Rendered at 60 Frames-Per-Second

Regular Note Values

Quarter Note → ♩ = 1 Second = 60 Frames

Eighth Note → ♪ = 1/2 Second = 30 Frames

16th Note → ♬ = 1/4 Second = 15 Frames

Triplet Note Values

3 ♪ = 1/3 Second = 20 Frames

3 ♬ = 1/6 Second = 10 Frames

FIG. 6

METHOD AND APPARATUS FOR GENERATING VISUAL IMAGES BASED ON MUSICAL COMPOSITIONS

RELATED APPLICATIONS

This application claims the benefit of the filing date of U.S. Provisional Application No. 60/644,630, filed Jan. 18, 2005, which is fully incorporated herein by reference.

FIELD OF THE INVENTION

The invention pertains to the visualization of musical passages. More particularly, the invention pertains to the generation of still or moving visual images that reflect the musical properties of a musical composition.

BACKGROUND OF THE INVENTION

Conceptually, visualization of music is not new. Composers have always described music with visual verbiage. "Tonal colors", "orchestral shapes", and "contrapuntal lines" are but a few of the phrases used by those struggling to articulate the nuances of their abstract aural art in familiar visual terms. In fact, developing the ability to visualize music, to quite literally see its shapes, textures, and colors in the mind's eye has been a goal of traditional training in composition for some 400 years.

Around the turn of the century, pioneers such as Wassily Kandinsky brought visual music out of their imaginations and onto canvas. Upon attending a performance of Wagner's Lohengrin for the first time, Kandinsky described the "shattering" synaesthetic experience: "I saw all my colours in my mind's eye. Wild lines verging on the insane formed drawings before my very eyes." Elsewhere in his prolific writing, Kandinsky explains that he associated individual colors with the keys of the piano and believed that musical harmony found its analogue in the harmony of colors produced by blending pigments on the palette. His bold use of abstract color and form evolved as a means to translate music's abstract components into the visual realm.

At the same time, the pioneers of modern music were using visual concepts to guide their development. Debussy, for instance, had originally wanted to be a painter. The famous French pianist Alfred Cortot, a contemporary of Debussy, explained that "Debussy possessed the ability to reproduce in sound the 'optical impression' that he had either formed directly or through his contact with pictorial art and literature." In perhaps his greatest example of pictorial music, La Mer, Debussy conveys his visual impression of the sea through a sonic image, even going so far as to translate ripples on the water's surface into shimmering violins.

But composers like Scriabin wanted to go even further, actually integrating projections of colors and images into live performances of their new works. At this stage, a new breed of visual artist began taking the first steps toward artistic synthesis. Turn-of-the century projection technology such as the magic lantern was very popular and was often used to project religious imagery coordinated to music during church services. Four decades later, Disney and the Philadelphia Orchestra proved that a seamless blend of classical music and then cutting-edge animation and movie projection techniques could bring symphonic music to the forefront of popular culture with the motion picture Fantasia.

More recently, music has been translated into visual images using computers and other electronics. For instance, many people are familiar with the visualization software incorporated into digital jukeboxes like Apple's ITunes, Microsoft's Windows Media Player, and MusicMatch Jukebox, which display a visual moving image that is somehow responsive to the music that is being played. The visualization method utilized by these applications is extremely rudimentary in terms of how the generated images are tied to or responsive to the music that is being played. Typically, these systems rely on simple methods of audio analysis to provide only surface-level music analysis. These basic methods include envelope detection, global loudness tracking, and frequency band amplitude spike detection. For instance, these systems may respond to a dramatic change in volume within a musical composition by showing a reading of the spikes in various frequency bands within the music such that a change in volume is represented visually. Alternately, changes in the image could be triggered according to user assignment rather than automatically, but with these systems, the underlying music analysis techniques, such as the oscilloscope showing volume spikes, derive only minimal musical information and meaning from the audio file and therefore are able to convey only minimal musical information with their resulting visuals. For instance, by watching the visuals that result from these systems with the speakers turned off, it would be impossible to determine what musical piece is generating the visuals because most of the musical information has been lost in the translation to visual form. Musical styles as diverse as classical and hip hop can and do produce extremely similar visual results using these systems. Many of these systems do not even synchronize their visuals to the basic beat and tempo of the music.

Some individuals working in the field of music visualization have attempted to develop score-based music visualization software that incorporates data corresponding to individual notes as well as some of the underlying structural elements within the music. For instance, U.S. Pat. No. 6,411,289 discloses a computer system for producing a three dimensional illustration of a musical work that determines for each sound of the musical work its tone, harmony, and tonality. Each of these characteristics of the musical work is assigned a value within a table so that it can be displayed on a three-dimensional graph having a time axis, a tone axis, and a harmony axis. By visually inspecting the static graph that results, one can determine the tone, the harmony, and the tonality of each sound by locating its position on the graph. The graph may also be colored in accordance with the corresponding tone, harmony, and tonality of a sound being played, and the graph may be scrolled from right to left and viewed from multiple angles.

While the visual representation generated by the software of U.S. Pat. No. 6,411,289 may reasonably accurately reflect the sounds to which it corresponds in the technical sense, it is actually much more difficult to read and understand the corresponding sound than it is with a standard musical score. The system requires the use of a predetermined grid layout with each note and harmony represented by pre-determined polygon shapes that are spread across the grid according to a pre-determined system. This system is inflexible and often results in impenetrable visual clutter if one attempts to represent all layers of a complex musical score simultaneously. For instance, with this system, individual notes are represented by solid colored structures that resemble skyscraper buildings of varying height spread across the grid. Only a limited number of these note structures can fit on the grid before it becomes impossible to determine which notes correspond to which instrumental layers because the notes in one layer block one's view of the notes in another layer. The only practical solution with this system is to limit the number of musical layers that are being visualized at any one time. While this may be adequate for educational situations where one wishes to teach students to follow only the melody line, or to follow harmonic changes, or some other element, the visuals resulting from this system cannot truly represent all of the information in the score simultaneously.

Additionally, this system relies on a proprietary animation software program that requires a cumbersome array of tables that organize the musical input data. The system cannot be readily adapted for use with existing animation programs or alternate methods of musical analysis. Furthermore, the system provides no flexible means for synchronizing its visuals to the changing tempos of live or recorded performance. It is, in effect, a closed system that may be adequate for its particular and limited educational purpose, but is not flexible enough to be reasonably adapted for artistic, creative, or other uses.

Therefore, it is an object of the present invention to provide an improved method and apparatus for music visualization.

It is another object of the present invention to provide an improved method and apparatus for generating a visual representation of a musical composition that visually preserves all or substantially all of the information that is represented in the corresponding standard musical score.

It is yet another object of the present invention to provide a visualization system that may incorporate any available method of musical analysis, including traditional tonal analysis, to include mathematical interpolation of musical data.

It is a further object of the present invention to provide a method and apparatus for generating a simulated or actual visible three-dimensional representation of a musical composition that accurately reflects the corresponding sound and is not difficult to read.

It is yet another object of the present invention to provide a method and apparatus for generating an accurate visual representation of music in real time as the music is being created or played.

It is yet one more object of the present invention to provide a method and apparatus for music visualization that generates an image corresponding to the music from which a layperson can appreciate the structure of the music.

It is yet another object of the present invention to provide a visualization system that is flexible enough to be realized through any combinations of existing or emerging music analysis systems and software, such that said music analysis systems and software may provide input data for music visualizations.

It is another object of the present invention to provide a visualization system that is flexible enough to be realized through any combinations of existing or emerging visual animation systems and software.

It is yet one more object of the present invention to provide a method and apparatus for music visualization that may be applied to an audio recording, such as a CD or MP3 recording, such that visuals generated by the invention may be marketed alongside their corresponding audio recording files as downloadable files for sale on I-tunes, or similar pay-per-download services.

It is yet one further object of the present invention to provide a method and apparatus for music visualization that may be embodied within a downloadable software program that consumers can use to automatically generate visuals for any recording or live performance.

It is yet one more object of the present invention to provide a visualization system that may be adapted for any number of entertainment purposes, including video games and virtual reality rides.

SUMMARY OF THE INVENTION

In accordance with a first aspect, the present invention generates a 3D animated version of a musical composition that can be synchronized to the changing tempo of a live or recorded performance, if necessary, by translating the score into a MIDI graph with an x, y coordinate mapping of all notes in the score, importing the resulting 2D paths representing each musical line into a mathematical analysis program for the purpose of generating piecewise smooth functions that approximate the music's implied curves, importing both the original x, y coordinate mappings from the MIDI score and the smooth mathematical functions that approximate each individual musical path into a 3D animation program, and shaping the two-dimensional paths imported from the MIDI graph and/or its smooth curve equivalents using 3D animation techniques to accentuate harmonic, contrapuntal, and other musical nuances. If a score is not available, but only a recording of the piece, then a score may be reverse engineered from the recording.

Alternately, the invention can be practiced in a simpler technique without generating a detailed electronic score. Particularly, appealing visualizations can be generated based on simpler data about coherent musical phrases within the music, such as, but not limited to, points of rhythmic, melodic, harmonic, and orchestrational tension and release in the musical work. Such data can be developed from a recorded musical work using, for instance, known audio-to-MIDI conversion software or audio analysis software. This simple structural information about the music is imported into 3D animation software, which can be programmed to trigger any number of 3D animation effects designed to convey the appropriate tension and release structures within the music in intuitive visual form. Alternately or additionally, certain effects may be triggered directly by a music visualization artist.

In accordance with another aspect, the present invention permits setting the frame rate of the animation to precisely synchronize with the appropriate beat values of a musical performance using an intelligent tempo control interface that allows a precise number of frames to play for each beat and/or subdivision thereof so that the rendered animations may be synchronized with live or recorded performance either manually or automatically. In accordance with this aspect of the invention, one selects a frame rate for the animation, the frame rate being a number of frames per musical time unit in the musical work, provides to said animation software a tempo of the musical work, and synchronizes the frame rate to that tempo.

In accordance with another aspect, the present invention generates a 3D animated version of a musical composition by translating the score into an x, y graph in which a y value of each note is representative of a pitch of that note and an x value is representative of a relative time of the note as well as a duration of the note, analyzing the musical work to identify discrete coherent musical phrases within the work, importing the graph into three-dimensional animation software, and generating a visual display depicting an object and applying at least one three-dimensional animation technique to the object, the object and/or the animation technique being a function of the graph and the musical phrases.

The above-mentioned embodiments of the invention are described in connection with situations where an artist wishes to generate 3D animations of a score and synchronize those animations to a live or recorded performance of that particular musical score. However, the invention may be used to generate real-time rendered 3D visualizations of music that may be synchronized to live or recorded performances of music that is improvisational or does not involve a written musical score.

One implementation of the invention particularly adapted for improvisational or other performances lacking a pre-known score involves the creation of a predetermined three-dimensional mapping system that allows each instrumental layer of a musical ensemble to occupy a unique location within a three dimensional space, the use of microphones and/or MIDI inputs to capture and isolate pitch and rhythmic data from each individual instrument (or group of instruments) performing in an ensemble, the use of pitch and rhythm tracking software to translate the incoming audio and/or MIDI data into a complete MIDI score including all instrumental layers as they are performed live, the real-time translation of this MIDI data into x, y coordinates representing the paths through space and time created by each individual instrumental layer in the ensemble, the importing of the x, y coordinates into a real-time 3D rendering engine capable of live-rendering animations that may be synchronized with the performance, and the application of a set of predetermined animation effects to the resulting 3D animated visuals such that a visual artist may shape and control various elements of the animation in a real-time response to and interpretation of the ensemble's live performance.

BRIEF DESCRIPTION OF THE DRAWINGS

FIG. 6 shows the appropriate frames-per-beat correspondence for the concerto depicted in FIG. 5

DETAILED DESCRIPTION OF THE INVENTION

Figure 1:
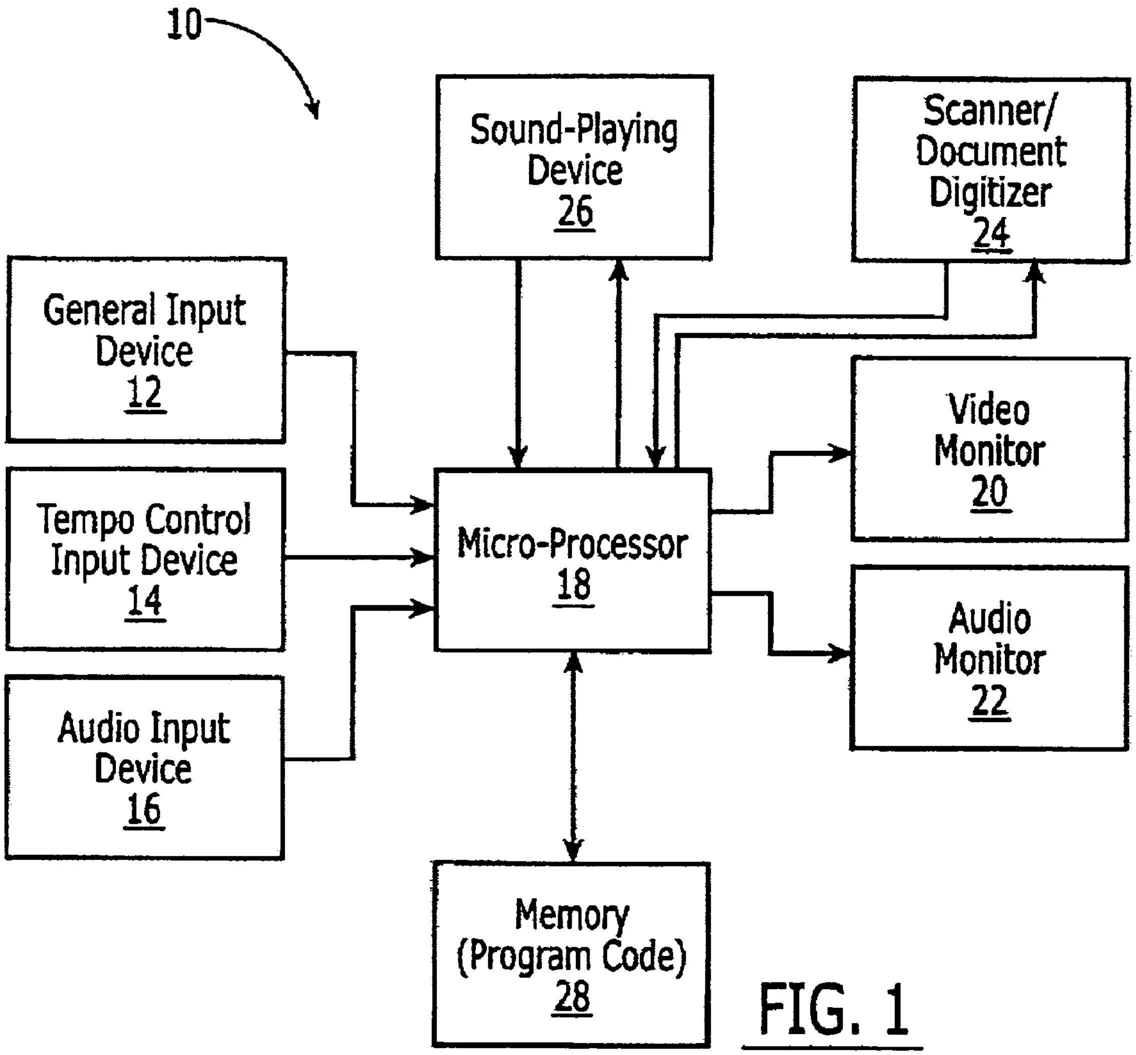
FIG. 1 is a block diagram of an embodiment of a system in accordance with the principles of the present invention adapted to generate three-dimensional visualizations of a musical performance that adheres to a predetermined musical score.

The present invention generates 3D moving images representing various aspects of a musical performance that can be synchronized, as necessary, to the changing tempo of a live or recorded performance, either automatically, or with live-controlled user input, and either with or without a score. The invention is broadly applicable to situations in which (A) a score is available, hereinafter referred to as score-based music visualization, (B) no fore-knowledge of the music is available, such as in the case of live improvisational music, hereinafter referred to as improvisational music visualization, and (C) only a recording of the music is available, hereinafter referred to as recording-based music visualization.

Various elements of the approaches outlined for these three categories may be combined, and certain steps in the process may be eliminated to reduce costs. However, the results of such combinations or omissions of the embodiments disclosed herein will be obvious to one skilled in the art of music analysis, computer programming, and 3D animation.

A critical factor in this invention is that, whenever possible, its process includes both analysis of the score (or equivalent of a score) to determine structural elements, such as but not limited to, rhythmic, melodic, harmonic, and orchestrational tension and release, as well as the mapping of the musical score from its existing two-dimensional representation into a more detailed (x, y) coordinate representation that can then be imported into and manipulated by any 3D animation software. Thus, through the analysis stage, information about the music's structure from a macro level, zoomed out perspective, is built into the resulting visuals while, on a micro-level, a one-to-one correspondence is established between the information in the musical score and the resulting three-dimensional visual representations. In cases where a score is not available ahead of time, but the entire musical work is available, e.g., only an audio recording is available, the equivalent of a score may be reverse-engineered via audio analysis using any number of existing and emerging pitch and rhythm tracking software solutions, such as the Solo Explorer WAV to MIDI conversion software available from the Recognisoft company.

Once the musical information is translated from the score (or its reverse-engineered equivalent) into the 3D animation program using the methods disclosed herein, the artist may utilize any number of animation techniques to manipulate the musical information so that it becomes aesthetically beautiful while elucidating the complexities of the music's structure. The animation techniques chosen will be informed by and linked to the macro-level structural information extracted through the analysis stage, such that the resulting visuals may intuitively represent the music's larger-scale structures in visual form. The method disclosed herein shall also ensure that the resulting animations may be perfectly synchronized with live or recorded performance and that embedded within these animations shall remain all of the musical information that was originally embedded in the musical score itself. Thus, the dynamic abstract animations that the present invention creates may be understood as a 21st century evolution of music notation which is not intended to make music easier for a musician to read and perform, as have all other evolutionary advances in music notation over the past 500 years, but rather is intended to make music easier for the average person to perceive.

A. Score-Based 3D Animated Music Visualization

When the music to be visualized is based upon a predetermined score, referred to throughout this disclosure as "score-based" music visualization, a process involving all or some of several possible steps is utilized to take advantage of the detailed fore-knowledge of musical information that the score provides. In the first step for this score-based process, the score may be analyzed using any available method including but not limited to tonal analysis or other analysis methods that extract meaningful structural information such as, but not limited to, points of rhythmic, melodic, harmonic, and orchestrational tension and release. For instance, the famous four-note opening of Beethoven's 5th Symphony creates rhythmic tension that is built and released throughout the first movement, an upward melodic leap in a solo voice creates melodic tension that is usually released downward by step in Mozart, Bach's V-pedal passages build harmonic tension that is eventually released with a return to the tonic, and the juxtaposition of thickly orchestrated strings followed by a solo in the woodwinds creates orchestrational tension and release in Brahms. The location of these tension and release elements throughout the score is part of the critical structural information about the music that will be translated into intuitive visual elements later in the visualization process.

In one score-based embodiment of this invention, mathematical interpolation and pre-rendering are used to achieve the most detailed images possible. The score is analyzed using traditional tonal analysis to identify points of rhythmic, melodic, and harmonic tension and release. The score is then translated into a MIDI format or other (x, y) coordinate mapping. The resulting 2D paths representing each musical line are then imported into a mathematical analysis program for the purpose of generating piecewise smooth functions that approximate the music's implied curves. Both the original (x, y) coordinate mappings, MIDI graph data, or other graph format, and any smooth mathematical functions that approximate this data, are then imported into a 3D animation program. The frame rates of the animation are then set to precisely synchronize with a given beat value, and various animation techniques are used to shape the two-dimensional paths imported from the MIDI graph or other graph format and any smooth curve approximations. The points at which these animation techniques are applied are set to correspond with rhythmic, melodic, harmonic, and orchestrational tension and release structures as determined by the previous analysis. For instance, a traditional tonal analysis may provide information regarding the point at which harmonic tension begins to build in the form of a V-pedal, the point at which said tension reaches its climax, and the point at which said tension is released. This data is then used to trigger a 3D animation effect that operates upon the entire score-based data set, as well as any mathematical interpolations of that data. In the case of building and releasing harmonic tension, the 3D animation effect may be a spinning vortex effect that is triggered at the beginning of the V-pedal, increases its spinning velocity until the V-pedal reaches its climax, and then dissipates at the point when the V-pedal is released. An intelligent tempo control interface then allows a precise number of pre-rendered frames to play for each beat and/or subdivision thereof so that the rendered animations may be synchronized with live or recorded performance either manually or automatically.

1. Elements of the System

Figure 5:
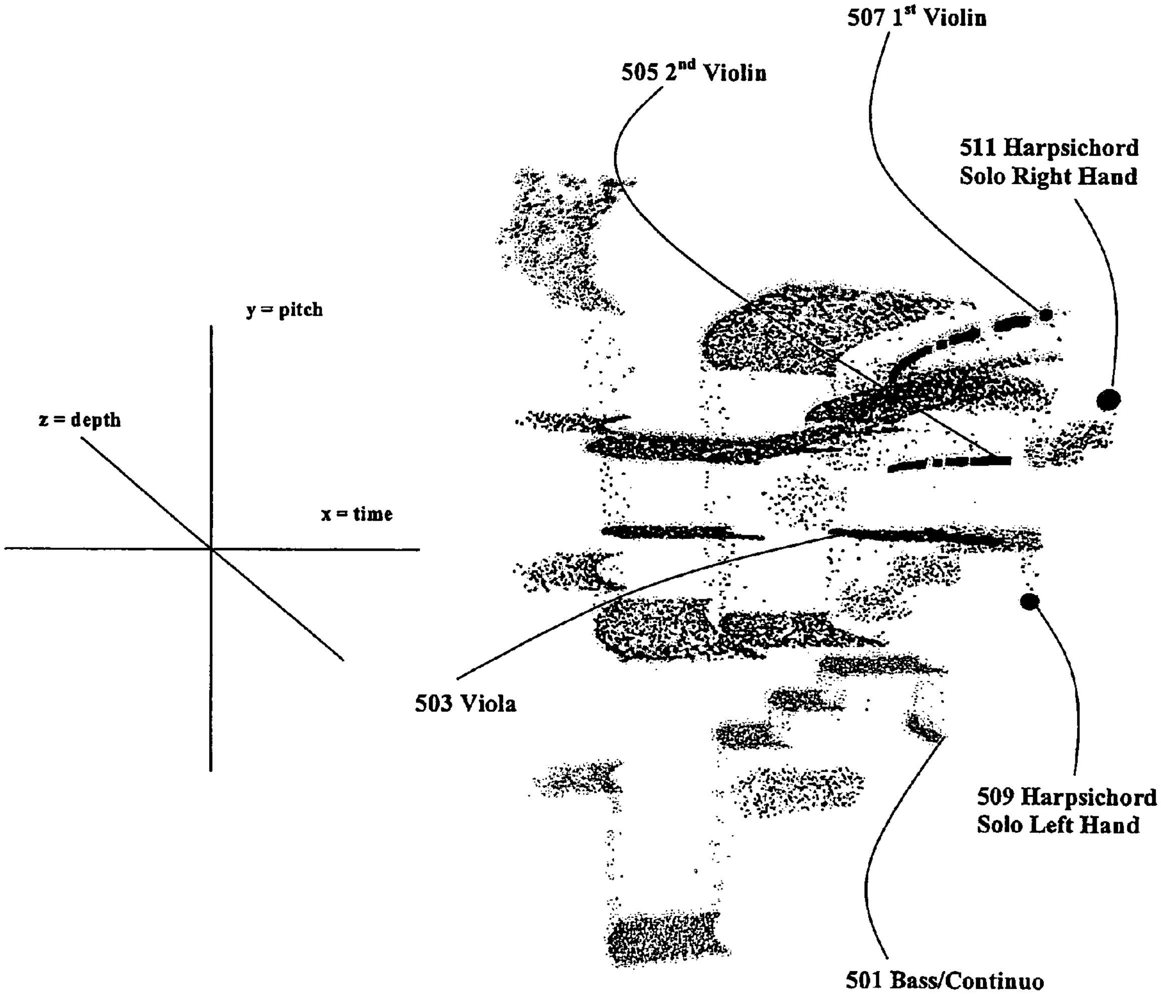
FIG. 5 illustrates a three-dimensional graphical representation created by the system of FIG. 1 utilizing the procedure of FIG. 2 corresponding to the First Movement of J. S. Bach's F-Minor Harpsichord Concerto.

Referring to the drawings, wherein like reference numerals designate like elements throughout the views, and referring in particular to FIG. 1, we see that the system 10 includes a general input device 12, a tempo control input device 14, an audio input device 16, a microprocessor 18, a display device 20, an audio monitor 22, a scanner capable of producing digitized images from paper images 24, a sound playing device 26, and a memory storing programmed code 28 that controls the operation of the microprocessor 18. The general input device 12 may be a typical keyboard, computer mouse, or the like. The tempo control input device 14 may be a MIDI keyboard controller or the like used to manually synchronize animations to live or recorded performances. The audio input device 16 may be a microphone or a plurality of microphones positioned to capture and isolate audio data from individual instruments for the purpose of automated synchronization of animations to live performance. The microprocessor 18 may be a conventional microprocessor that interfaces with the general input device 12, tempo control input device 14, and audio input device 16 to receive the inputted data. The display device 20 may be any type of video monitor or other display device, such as a standard, flat panel, plasma, or LCD projector display. The audio monitor 22 may be standard headphones or speakers. The scanner 24 may be a standard scanner designed to digitize paper documents into a format that can be stored on the memory 28. The sound-playing device 26 may be a CD-ROM player used to play music from a recording for the purpose of synchronizing animations to the recording's tempos. The memory 28 may be a permanently installed memory, such as a computer hard drive, or a portable storage medium such as a computer disk, external hard drive, USB flash drive, or the like. Stored on the memory 28 may be audio and MIDI files or files of other formats designed to store all of the information in a musical score in digital form. Also stored on the memory 28 may be programmed code including proprietary and currently available ("off-the-shelf") software that, when utilized systematically as described in more detail below, can be used to control the microprocessor 18 to effect the transformation of a musical score from a two-dimensional representation on paper to a digital MIDI file and then to a three-dimensional visual animation. This animation may be stored in the memory 28, played back via the microprocessor 18, and viewed on the display device 20. The image(s) produced on the video monitor 20 may be a three-dimensional visual representation of the musical score, as depicted in FIG. 5. The entire system 10 except the scanner 24 may be embodied in a personal computer, laptop computer, handheld computer, or the like.

2. The Preferred Method

Figure 2:
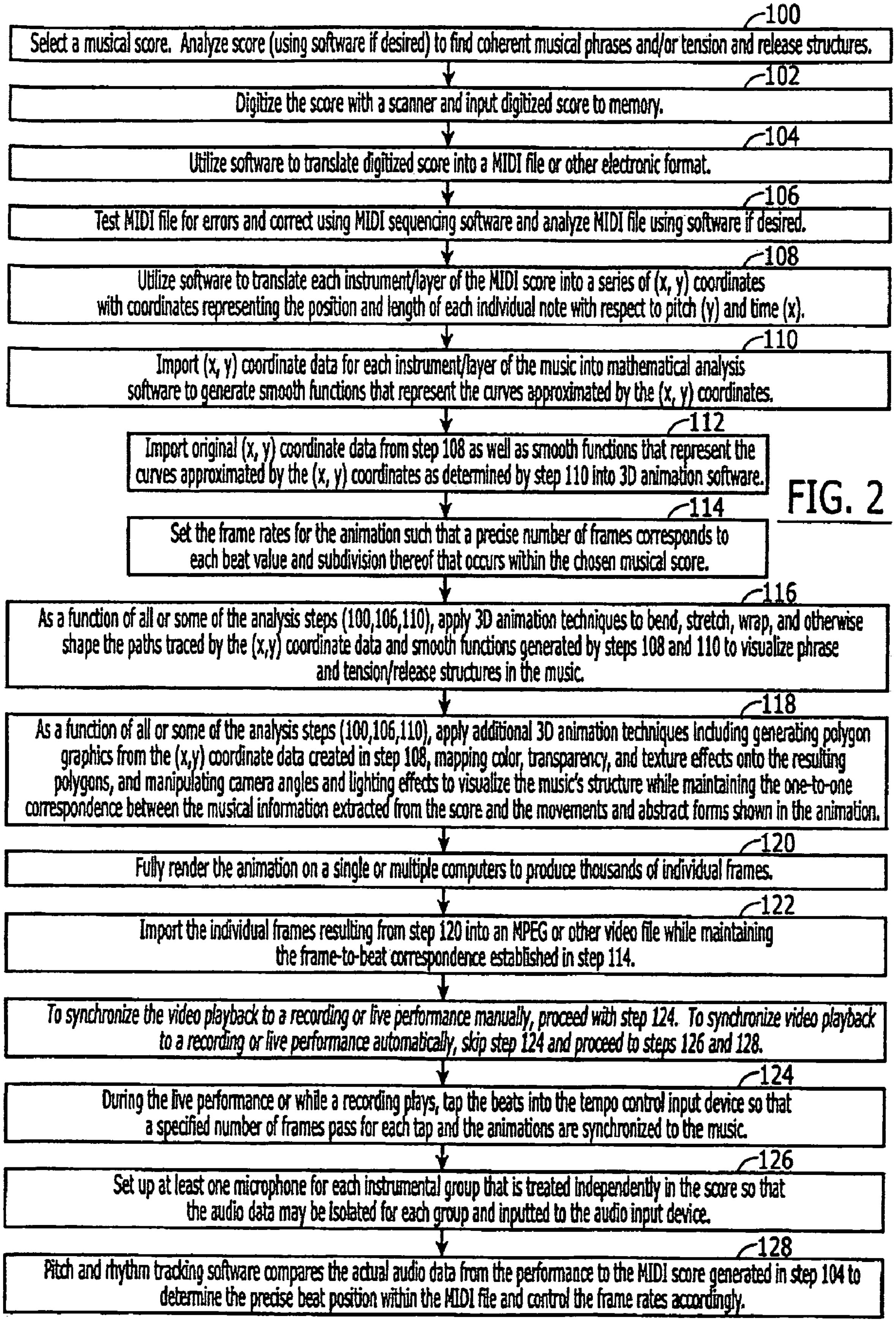
FIG. 2 is a flow chart depicting an embodiment of a method in accordance with the principles of the present invention for generating three-dimensional visualizations of a musical performance that adheres to a predetermined musical score.

A flow chart illustrating a preferred method of creating 3D animations of a musical score and synchronizing those animations to a live or recorded performance is shown in FIG. 2. This method begins with the selection of a musical score, usually in a paper version, and the analysis of said score to extract structural information such as the location of various phrasings and/or harmonic and other tension and release structures (step 100). The analysis of the score may be performed manually following the traditional methods of tonal music analysis to identify meaningful phrases, harmonic features, and other structural components. Alternately, score analysis may be performed using automated software. Over a dozen suitable music analysis software programs that embody the necessary technology are available for free download at the following web site: http://uweb.txstate.edu/~ns13/CAMA-Links.html. After a score is selected and analyzed, it is then digitized using a standard scanner 24 with the resulting digitized version of the score passing through the microprocessor 18 and being stored in the memory 28. A software program also stored on the memory 28 is then used to translate the digitized version of the score into a standard MIDI file (step 104). There are numerous commercially available software products that translate digitized scores into MIDI files, including, for instance Smart Score precision music scanning software, produced by Musitek Corporation and Photoscore 4 music scanning software, produced by Neuratron LTD.

The resulting MIDI file likely will contain some errors due to the imperfections in the original printing of the paper version of the score and these must be corrected using MIDI sequencing software stored on the memory 28 (step 106). Again, suitable MIDI sequencing software products are widely available on the market, including, for instance, the aforementioned Digital Performer 4.6, produced by MOTU, and Reason 3.0, produced by Propellerhead. It may be helpful to listen to the MIDI file to detect errors by playing it back with the MIDI sequencing software through the audio monitor 22.

Several important musical works are readily available as MIDI files and if one elects to develop animations for one of these works, one may skip steps 100-104 and use a pre-created MIDI file rather than create one from a paper score. In this case, one may still wish to test the MIDI file for errors (step 106) as commercially available and free-for-download MIDI files are often imperfect. Additionally, when one elects to skip the paper score altogether (steps 100-104), the analysis process to determine meaningful phrases and points of harmonic or other tension and release may be performed directly upon the MIDI file (step 106). Suitable software that can automatically perform the required harmonic and other analysis steps upon a MIDI file has been developed by Daniel Sleator and Davy Temperley. This software, known as The Melisma Music Analyzer, is available for free download at the following web site: http://www.link.cs.cmu.edu/music-analysis/).

Figure 3:
FIG. 3 is the score of the beginning of a 3-voice fugue notated in standard score notation.

To better understand the reasoning behind the next steps, steps 108-112, let us first consider FIG. 3, which represents the beginning of a 3-voice fugue notated in traditional music notation (standard score notation). Before one can create a three-dimensional representation of this music, one must first translate the standard notation in FIG. 3 into a form that maintains all of the information embedded in the score but can also be easily imported into a 3D animation program. A standard score already provides a vertical y-axis representing pitch and a horizontal x-axis representing time reasonably well, but the subdivisions of these axes are not easily quantifiable and thus cannot be directly imported into a 3D animation program. For instance, while, in a standard score, pitch or frequency is generally represented by the position of the note in the vertical direction (up and down on the page), the vertical position of the note is not fully representative of the pitch of the note. For instance, the flat, sharp, and natural of each note appears in the same vertical position in a standard score notation despite the fact that they each have different pitches. Also, while the relative timing of notes is somewhat represented by its position in the x dimension, the actual duration of the note is represented by the form in which the note is written and not by its length in the x direction.

Thus, after translating the music into a standard MIDI data file (steps 102-106), one can generate a MIDI graph of the music that provides precise numeric x, y coordinate data for all of the individual notes (step 108).

Figure 4:
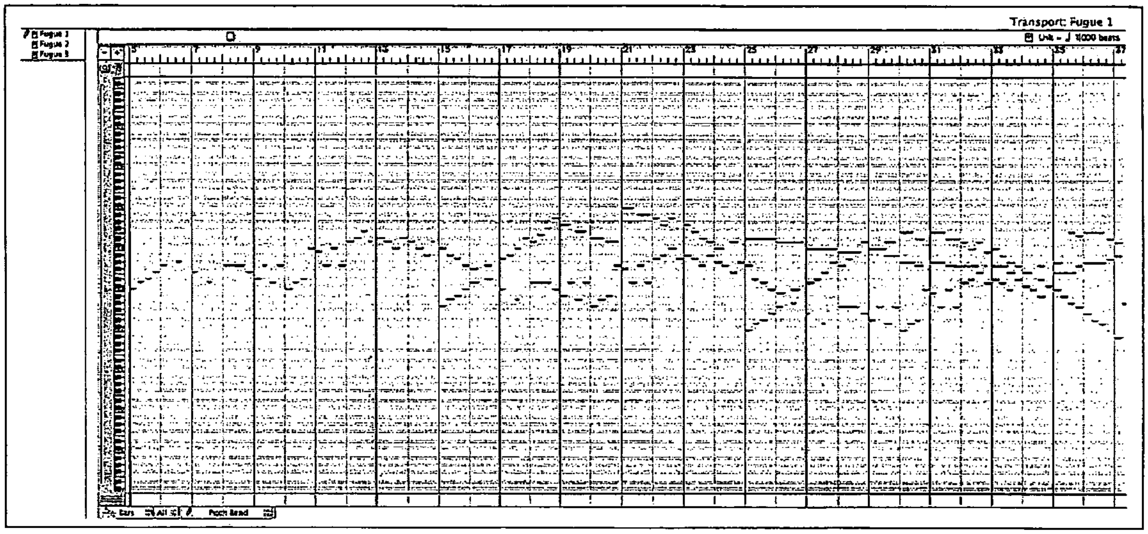
FIG. 4 [Prior Art]
FIG. 4 is the beginning of the same 3-voice fugue of FIG. 3 graphed by a MIDI sequencing program so that precise x, y coordinate data may be obtained for each note of each instrumental layer of the musical score.

A precise x, y coordinate graph can be generated manually, but. software is widely available that can generate such graphs automatically. FIG. 4, for example, represents the beginning of the same 3-Voice Fugue as graphed by the aforementioned MIDI sequencing software program Digital Performer 4.6 available from MOTU, Inc. (stored on the memory 28). No new information has been added to create this graph, but rather this graph is an alternate way of looking at the same musical information that was previously represented by the musical score. This graph has several key differences from the standard score notation. Most importantly, the graph version stretches the y-axis representing pitch and provides a graphical representation of the music in which the vertical position of each note is exactly representative of its pitch. Specifically, gives equal spacing to all of the chromatic half-steps in the music so that, for instance, an A-flat, A-natural, and A-sharp all occupy different positions on the vertical or y axis. Furthermore, each note of each voice is represented by a horizontal bar, the length of which is exactly representative of the duration of the note.

In the MIDI graph version of the fugue (FIG. 4), it can be seen that the bars representing the notes outline a series of parabolic curves that are traced in whole or in part by all three of the voices as they move through the x, y coordinate plane. These parabolic curves are impossible to perceive visually in the standard score notation version of the same information (FIG. 3), but become clear in the MIDI graph version because the MIDI graph decompresses all of the pitch (y-axis) information that was in the score notation version. The MIDI graph also provides a continuous, uninterrupted x-axis representing time that aids visual perception of nuanced patterns.

Thus we see that, although standard notation makes it difficult to perceive visually, the musical path traced by each individual voice of this fugue is actually a linear approximation of a parabolic curve. Linear approximation of curvature is the fundamental concept behind Newtonian calculus and also plays an important role in the music of Bach, Mozart, and many other contrapuntal masters. According to Newton, a particle travels on a curved path only if some force, such as gravity, is acting upon the particle to accelerate it in a particular direction. Otherwise, the particle would continue to travel in a straight line forever. Thus, a baseball that is hit deep into center field follows a predictably parabolic path as its trajectory is bent by gravity, tracing out a graceful curve that thousands of breathless fans and one nervous pitcher follow in anticipation. Musical particles can follow similarly curved paths that generate a similar sense of anticipation, tension, and eventual release in the listener. The process to be outlined in step 110 will help to make those paths, the forces that cause their curvature, and the resulting feelings of tension and release easier to perceive visually than standard notation (FIG. 3).

Once the music has been translated into a MIDI graph like that represented in FIG. 4, the resulting bars representing each individual note within a melodic line can be treated the same way a physicist or mathematician would treat a data set resulting from a ballistics experiment (step 110). The data set is imported into a mathematical analysis software program such as Mathematica 5.2, available from Wolfram Research, Inc., or MatLab, available from The MathWorks, Inc. (stored in the memory 28). This software is then used to map a piecewise smooth mathematical function over the bars representing each note. Once a mathematical function has been developed to approximate the data set, it becomes possible to calculate the acceleration of the flow of energy within that musical line so that the nuances of its trajectory may be precisely quantified. Furthermore, the smooth functions generated by the mathematical analysis software will define a series of smooth curvilinear skins or surfaces that can be placed over the less smooth x, y coordinate data generated by step 108, resulting in structures that represent said x, y coordinate data but are more visually appealing. Essentially, the raw x, y coordinate data developed via step 108 is assumed to be a linear approximation of an implied curve. The curves defined mathematically via step 110 represent the actual curves that the composer intended to approximate. In many cases, the curves developed by step 110 prove to be more aesthetically pleasing than the actual x, y coordinate data developed via step 108, in the same way that a building with steel frame exposed is less appealing than a finished building with glass, metal, or other skins applied over the steel frame to smooth its lines. The micro-level or "zoomed in" analysis of melodic layers in step 110 provides additional structural information that will inform the use of 3D animation effects utilized in steps 116 and 118, supplementing the previous "zoomed out" analysis of the entire score (steps 100 and/or 106).

Given that so many of the great master composers seem to go to great trouble to trace out smooth and interesting curves through a particular succession of pitches, one may ask why they do not simply notate true curves by bending each pitch into the next through glissandi. The reason composers do not generally do this is that a linear approximation is sufficient to give the implication of curvature and the linear approximation method also allows the composer to convey an extra layer of harmonic information. By staying on a single pitch for a defined period of time and then moving immediately to another higher or lower pitch, the composer ensures that the listener will perceive that particular pitch's relationship to the notes above or below it on the pitch axis (y-axis). While employing glissandi or pitch bending might result in more precise musical curves in each individual melodic voice, this would completely obscure the precise relationships between pitches on the y-axis (pitch axis) that are critical to the perception of harmony. Composers who wish to maintain harmonic complexity while also implying complex curves that change direction quickly must employ smaller note values so that a greater number of data points support the perception of the curve that is implied. This phenomena can easily be observed in the music of Bach and many other great masters, who often use running 16th notes or even smaller subdivisions in order to trace out complex curves in contrapuntal forms such as canon and fugue while also preserving a complex progression of harmonies made possible by the fact that the pitch values are always distinct at any given point in time.

Thus, to summarize steps 108 and 110, after a musical score has been translated into a MIDI graph, the path of each individual melodic voice in the composition can be expressed through a sequence of x, y coordinates (step 108) and these coordinates can be analyzed to produce functions that define curves which fit smoothly over these coordinates (step 110). The functions defined through step 110 reveal detailed structural information about individual melodic layers that will inform the choice of effects used to visualize these layers in steps 116 and 118.

Although a process that does not include step 110 will necessarily sacrifice some of the possible nuances that could have been conveyed in the resulting visualizations, step 110 can be thought of as optional, as appealing visualizations can also be generated using only the x, y graph, as discussed below.

In step 112, both the original x, y coordinate data from step 108 and any curves generated by step 110 are imported into a 3D animation program, such as 3ds Max 8, available from Autodesk, Inc., or Maya, available from Alias Systems Corp. (now owned by Autodesk, Inc.). One can then choose either or both of the paths represented by the x, y coordinate data of each individual melodic line developed via step 108 or their smooth equivalents generated via step 110. The chosen two dimensional paths are then placed within a three dimensional space such that each individual path may be given its own unique position with respect to a z-axis, adding depth to the resulting visual composition. As just one possibility amongst many, the positions of each musical path along the added z-axis (the depth axis) might reflect the corresponding orchestrational layers (e.g. Woodwinds, Brass, Percussion, Strings, etc.). Once these paths have been imported into a three dimensional space, they then define the paths along which animated objects will fly to represent the movement of each individual melody against time.

The objects themselves could have any number of visual manifestations. In one embodiment of the invention, the object can be the x, y graph itself or the smooth linear approximation thereof, which can be animated using the principles of the present invention. The user can also select any number of objects to animate from a menu, but it is believed that the most appealing visualizations will have a distinct object to represent each individual melodic line in the composition. Conceivably however, there can be a different object for each instrument. For instance, for chamber music comprising only 3, 4, or 5 instruments, an appealing visualization can be created using a different object for each instrument. It is, in fact, possible to have multiple objects for a single instrument, such as a piano. Solo and ensemble piano compositions often have two (or more) melodic lines. As long as they follow the paths imported via steps 108-112, the listener/viewer will be able to intuitively connect the movement of the objects with their corresponding audio layers within the musical texture. The artist may choose to change the particular object representing a given layer of the music as the piece progresses. This may be aesthetically pleasing, for instance, when the general character of that melody changes or when the melody is picked up by another instrument. The possibilities, of course are endless, and limited only by the artist's imagination.

FIG. 5 shows a snapshot of the beginning of the 1st Movement of Bach's Harpsichord Concerto in F-Minor as animated using the principles of the present invention according to the inventor's artistic vision. Here, the musical objects are semi-transparent horizontal planes 501, 503, 505, 507, 509, and 511, flowing from left to right through a three-dimensional space. These planes correspond to the following melodic layers in the score: Bass/Continuo (501); Viola (503); $2^{nd}$ Violin (505); $1^{st}$ Violin (507); Harpsichord Solo Left Hand (509); and Harpsichord Solo Right Hand (511). Note that the x direction is generally left to right, the y direction is generally up and down, and the z direction as generally in and out of the page in FIG. 5. We qualify the directions in the preceding sentence with the term "generally" because, as can be seen, the x, y, z coordinate system actually is slightly askew to the surface of the page in FIG. 5 so that all three dimensions can be perceived in the image. For instance, if the z axis were perfectly perpendicular to the plane represented by the page, it would not be possible to perceive any z axis depth in the image. Let us not forget that, in an embodiment of the invention such as illustrated in FIG. 5, in which the generated visualizations are rendered on a two dimensional screen, computer monitor or other two dimensional display, the images are, in fact, not actually three dimensional, but instead are two dimensional representations of three dimensional visuals (i.e., just like a photograph or a video is a two dimensional representation of a three dimensional world).

In FIG. 5, the planes leave a dust trail behind as they fly along the x, y coordinate paths imported from the MIDI graph (step 108).Each layer of the orchestral score is distinctly realized. The x, y coordinate path 501 representing the Bass is on the bottom, the viola's path 503 is above that, the 2nd violin's path 505 is above the viola, and the 1st violin path 507 is above the 2nd violin. The two paths representing the left and right hands of the harpsichord soloist 509 and 511, respectively, are set slightly ahead of the orchestral instruments paths along the x direction in a manner consistent with the physical placement of the soloist on a performance stage.

Note that, as practical matter, it will commonly be desirable to have the axis that most closely corresponds to time, e.g., the x axis in FIG. 5, to move, rather than for the objects to move. For example, if we assume that the x axis generally corresponds to time and that the forward direction of time is left to right in FIG. 5, then rather than having the objects 501, etc, move from left to right, we create a visual scene that allows the coordinate system itself to move from right to left, rather than having the objects themselves move from left to right. Otherwise, the objects would move off of the screen after a short period of time. This is basically similar to a camera following a moving object (e.g., a car) so that the object remains centered in the screen while the background moves in the opposite direction from the direction of movement of the car.

Each melodic layer in FIG. 5, represented by the individual 2D path that was imported into the animation program in step 112, is animated according to the artist's imagination to visually represent what that melodic layer of the music is doing at that time. Merely as one example, the volume of a particular note within a particular melodic layer can be represented by making the corresponding plane wider when volume increases and thinner when it decreases (in the z direction). Note that, when a melodic layer is represented as a plane, as in FIG. 5, the afore-described type of visual representation of volume change essentially is just extruding the plane in both directions along the z-axis (because, regardless of volume, the pitch is the same and the pitch and time elements are already represented by the plane's x and y positions). An alternate possibility would be to make the plane more or less transparent corresponding to increases or decreases in volume for the individual note represented by that plane, or to change the plane's color in response to same. Any number of possibilities will be used by artists in order to stretch or bend the individual notes represented by the (x-time, y-pitch) position data along the third depth axis (the z-axis) such that unique 3D abstract forms are created that represent not only the time and pitch (x, y) data corresponding to each note, but also additional information such as, but not limited to, the volume of each note, the articulation (legato vs. staccato, for instance), and the use or lack of vibrato. While selecting from amongst the various animation possibilities in steps 116 and 118, the artist is guided by the results of the previous music analysis process in accordance with steps 100 and/or 106 and/or 110, such that the animation effects selected will make it easy for a lay person to perceive the corresponding musical elements in visual form.

In order to synchronize the eventual animations with live or recorded performance, the frames-per-beat should be set precisely (step 114). Note that frames-per-beat is merely an exemplary embodiment and that the number of frames can be set as a function of any other musical time unit, such as per beat, per quarter note, per eighth note, per bar, per measure, etc. First, one should determine the smallest subdivision of a beat that occurs in the musical work to be visualized. If, for instance, the piece includes subdivisions down to triplet 16th and regular 16th notes, then one should assign a precise number of frames per beat of the animation to ensure that every note corresponds in time to an integer number of frames. Additionally, one should keep in mind that frame rates in excess of 60 frames-per-second may cause the microprocessor 18 to slow down when a rendered video file stored in the memory 28 is played back. Thus, the tempo of the performance must be taken into consideration when setting the frames-per-beat in the 3D animation software in step 114.

FIG. 6 represents an appropriate frame-per-beat rate for the First Movement of Bach's F-Minor Harpsichord Concerto (the musical work depicted visually in FIG. 5) as determined via step 114 of FIG. 2. This movement is in 2/4 time with the quarter note getting the beat. The movement includes regular quarter notes, 8th notes, and 16th notes as well as triplet 8th and 16th notes. The frames-per-beat were set at 60 frames per quarter note. It then follows that there will be 30 frames per 8th note, 15 frames per 16th note, 20 frames per triplet 8th note, and 10 frames per triplet 16th note. Thus, the frames-per-beat rate has been properly set in accordance with step 114 of FIG. 2 so that all note values that occur within the piece will receive a precise integer number of frames and no note values will require half frames.

Once the music is translated into a MIDI graph or other graphical form (step 108), the resulting numeric x, y coordinate values of the music are entered into a 3D animation program (step 112), and the frame rate is properly established (step 114), the artist can then, as detailed in steps 116 and 118, apply any number of 3D animation techniques to bend, stretch, wrap, or otherwise alter the visual objects representing the various musical paths in order to convey visually the structural elements that were determined through the analysis steps (100, 106, 110) while still maintaining the one-to-one correspondence between the resulting 3D visualizations and the original information embedded in the musical score.

In one realization of step 116, 3D animation techniques are applied to shape the musical paths imported into the animation program for the purpose of representing harmonic structure. Merely as one possible example, all of the musical paths representing each individual voice/layer in a musical texture may be wrapped around the surface of a rotating cylinder, cone, or other shape to create a macro-level vortex or other structure while maintaining the micro-level one-to-one correspondence between the movement of each individual voice on its own relative x, y coordinate plane and the movement dictated by the x, y coordinate plane of the MIDI score developed in step 108 (or the piecewise linear approximation thereof developed in step 110).

Figure 7:
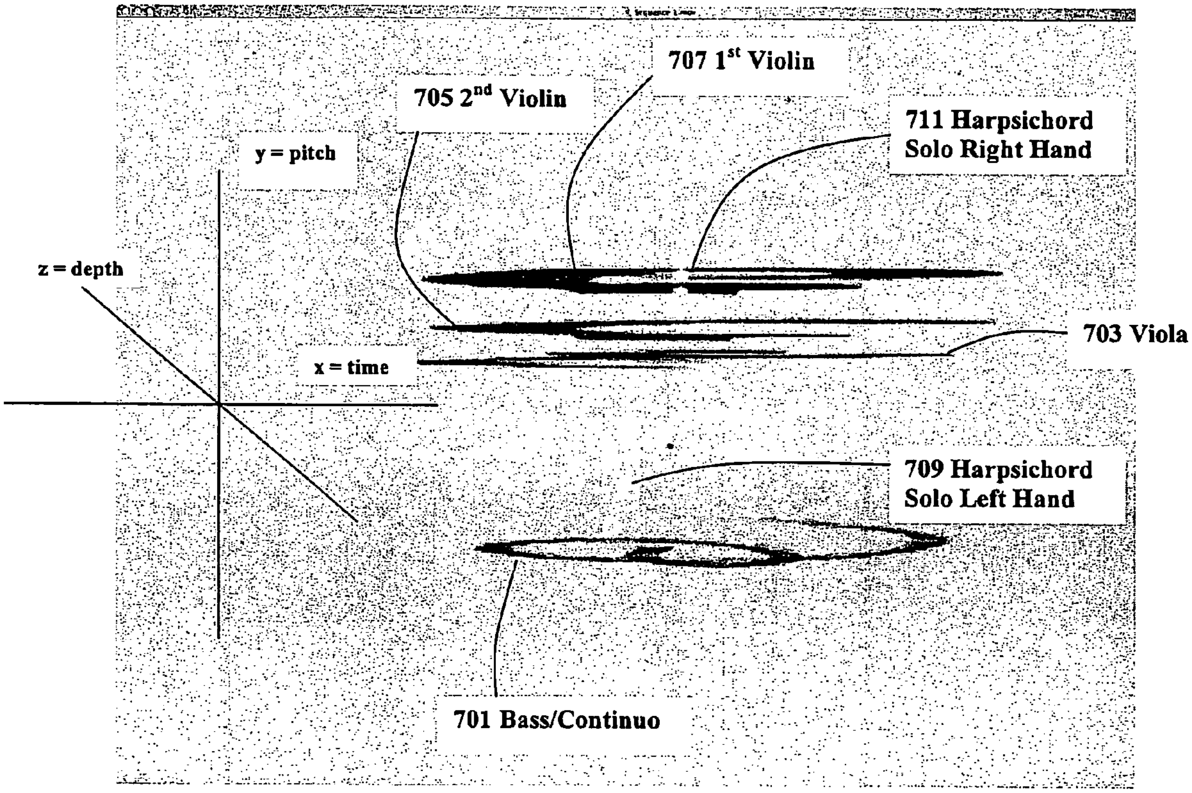
FIG. 7 is a snapshot of a moving image corresponding to a harmonic structure known as a V-Pedal in the concerto depicted in FIG. 5 that can be created in accordance with the principles of, and using the system of the present invention by wrapping the two-dimensional x, y coordinate paths representing each individual melodic voice around a three-dimensional rotating vortex or cylinder within a 3D animation program.
Figure 8:
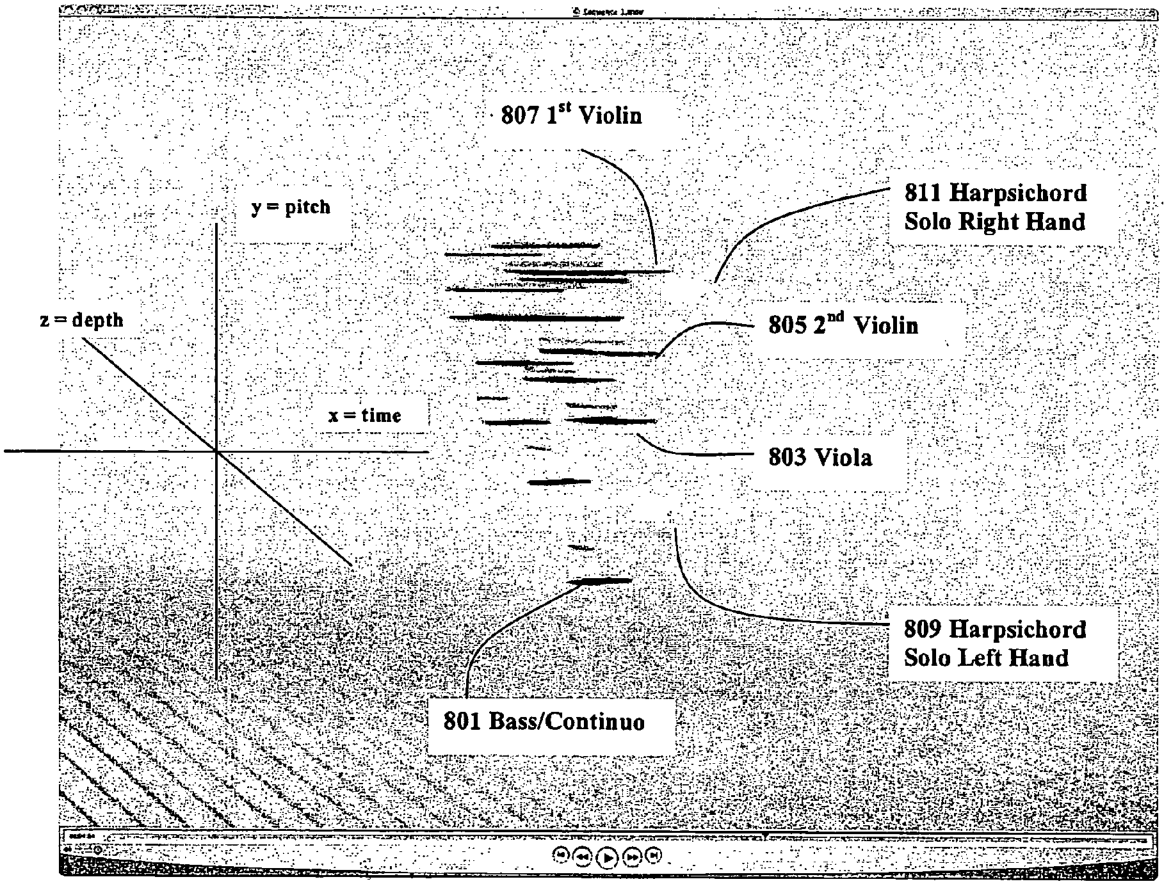
FIG. 8 is a snapshot of the same 3D animation of music in FIG. 6 a moment after the harmonic tension of the V-Pedal has been released and the musical voices have returned to their former paths.

FIG. 7 represents a snapshot of this wrapping technique as it was applied to a V-Pedal passage in Bach's F-Minor Harpsichord Concerto, 1st Movement (the same work visually depicted in FIG. 5). The paths 701, 703, 705, and 707 representing the orchestral voices Bass/Continuo, Viola, 2$^{nd}$ Violin, and 1$^{st}$ Violin respectively, have been wrapped around the paths 709, representing the left hand of the harpsichord solo voice and 711, representing the right hand for the duration of the sustained V-Pedal. As long as Bach continues to build the tension of the V-Pedal, the musical paths continue to rotate in a stationary vortex, but as soon as Bach releases the tension by resolving the V-Pedal to a I-Chord, the paths return to their previous configuration and begin to move from left to right again as seen in FIG. 8. Thus, via step 116, harmonic tension and release may be represented by the application of various 3D animation techniques to bend and shape the musical paths that were imported as x, y coordinate data or curves generated from that data via steps 108-112. The curvature and wrapping effect applied is informed by the harmonic component of the analysis results (steps 100 and/or 106) such that the effect may be used to visualize the harmonic tension and release structure intuitively.

For step 116s and 118, a variation of this technique can also be used to represent a change of key (e.g. from F-minor to A-flat Major). The macro-level path relative to which all individual voices move may change angles when the key changes and eventually wrap back upon itself and return to the starting angle when the piece returns to the original key. For instance, with reference to FIG. 5, the planes representing the layers of the musical piece are horizontal. If the key changes, those planes may be tilted slightly upward or downward (considering the direction of movement to be left to right). This technique would be particularly effective for visualizing musical forms such as Sonata Form, which are built upon the juxtaposition and balance of musical material presented in two different keys with the form eventually resolving its inherent tension by returning to the first key in which it began. Both the form of the piece and its individual harmonic key areas are determined through the analysis steps (100 and/or 106) such that said analysis informs the use of these effects and said effects become a function of said analysis.

Another visual concept that can be used in steps 116 and 118 to represent harmonic structures involves projecting a semi-transparent grid into the space through which the musical paths flow with said grid representing the overtone series projected above the lowest note sounding at any given time. This technique can be used to accentuate the harmonic structure by highlighting or otherwise accentuating any notes above the bass that line up with the grid (forming stable, relaxed harmonies) or strongly negate the grid (forming unstable tense harmonies with more dissonance). Thus, the acoustics/physics of the overtone series and its harmonic implications may be incorporated into the visualization in order to make harmonic information easy to perceive visually. Again, the analysis of the music in steps 100 and/or 106 has been incorporated into the visualization in order to aid intuitive perception of musical harmonic structures.

Contrapuntal techniques may also be elucidated in step 116 via application of 3D animation techniques that enhance the symmetries already embedded in the musical paths that were brought into the 3D animation software via steps 108-112. Canonic writing can be represented by having the first voice leave a trail in space representing its path and then moving that trail below or above on the pitch and time axes and inverting or reversing its orientation so that, once it locks into the correct position, it represents the delayed entrance of the second canonic voice either above or below the first voice and either inverted or in retrograde according to the contrapuntal technique utilized. Here, the micro-level analysis results from step 110 can serve as a guide for decisions involving which 3D effects may be applied in order to best visualize contrapuntal structures intuitively.

Relating specifically to step 118, camera angles can be manipulated in the 3D visualizations so that the viewer can follow the path of any individual voice and experience the acceleration (curvature) of that voice as it flies up and down in a manner similar to that used by virtual reality flight simulators to fool the brain into perceiving motion and acceleration.

This technique could even be extended into a virtual reality ride that reproduces actual sensations of acceleration via physical movement. In this case, the ride would move the occupants against gravity to physically approximate feelings of acceleration that maintain a one-to-one correspondence to the visual perception of acceleration that is created when a first-person perspective camera angle is used to view the 3D animation from the perspective of a given musical line. For instance, a person could visually "ride" the viola's path as if it were a roller coaster on a track. The viola could climb up past the second violin track and then dive down through the cello track before returning to its original location in the middle of the texture. This virtual flight experience through the abstract world of music would be depicted visually, acoustically, and physically with the physical sensations of acceleration produced by the ride linked precisely to visual and acoustic information presented on a screen and via speakers. In order for this to be effective, however, the visual and gravitational effects must be a function of the music as analyzed in steps 100 and/or 106, and step 110.

In another realization of step 116, changes in key and harmony may be interpreted via colors that represent the energy levels of the keys and specific chords with respect to the home key, possibly based on the ROYGBV (Red, Orange, Yellow, Green, Blue, Violet) succession from lowest to highest energy, so that the key and harmonic changes are consistently represented visually in a way that the brain intuitively understands. In this case, the color would become a function of the harmonic structure as determined via the analysis (steps 100 and/or 106).

These are but a few of the possible realizations of steps 116 and 118. Countless others will be apparent to those skilled in the art of music and 3D animation. However, in accordance with a preferred embodiment of the invention, at all times, the 3D animation techniques employed to create visually appealing abstract forms are informed by the results of the analysis steps (100, 106,110) and are designed to preserve the original one-to-one relationship back to the information in the score itself. Because these relationships are always preserved, the average listener/viewer is able to intuitively understand that the visuals are directly linked to and generated by the music itself and the resulting abstract visual art is not only aesthetically pleasing but also functional as it helps the viewer to follow the music more precisely.

As previously noted, a significant aspect of the present invention is to analyze the musical composition to extract meaningful discrete coherent musical phrases from it that can be represented and animated with corresponding discrete coherent visual phrases (steps 100, 106, 110 in FIG. 2). These phrases have meaning to the listener and will be used to drive the visualization process.

Any serious student of music is well acquainted with various techniques, such as tonal analysis and other analysis methods, for parsing out from a score these discrete coherent musical phrases, such as, but not limited to, sequences of rhythmic, melodic, harmonic, and orchestrational tension and release and other musical antecedent/consequent structures.

For instance, a discrete coherent musical phrase is a section of a melodic line of a composition that a listener intuitively perceives as a unit, such as the "hook" of a popular music song. Another likely musical phrase would be a portion of the piece comprising a build up of musical tension and its release. To reiterate the specific examples cited previously as illustration, the famous four-note opening of Beethoven's 5th Symphony creates rhythmic tension that is built and released throughout the first movement, an upward melodic leap in a solo voice creates melodic tension that is usually released downward by step in Mozart, Bach's V-pedal passages build harmonic tension that is eventually released with a return to the tonic, and the juxtaposition of thickly orchestrated strings followed by a solo in the woodwinds creates orchestrational tension and release in Brahms. The location of these tension and release elements throughout the score is part of the critical structural information about the music that will be translated into intuitive visual elements in the visualization process.

Because the parsing of music into discrete coherent musical phrases based on principles of music cognition and perception has been well studied, there are several available methods of analysis that provide meaningful ways to control music visualizations. For example, a semantic parser might analyze the rhythmic structure of the music on the level of a musical measure and determine patterns of tension and release. Examples of existing methods developed within the academic field of music perception, include Eugene Narmour's Implication-Realization Model(The Analysis and Cognition of Basic Melodic Structures, The University of Chicago Press, 1990), J. Thomassen's model of melodic salience (see Thomassen, J. (1982) "Melodic accent: Experiments and a tentative model", Journal of the Acoustical Society of America, 71(6), 1598-1605), F. Lerdahl's model of melodic attraction, Lerdahl, F. (1996) "Calculating tonal tension", *Music Perception,* 13(3), 319-363, M. R. Jones' model of Phenomenal accent synchrony, (Jones, M. R. (1987), "Dynamic pattern structure in music: Recent theory and research", Perception and Psychophysics, 41, 621-634, and P. von Hippel's method for calculating Melodic Mobility, (von Hippel, P. (2000), "Redefining pitch proximity: Tessitura and mobility as constraints on melodic interval size", Music Perception, 17 (3), 315-327).

Once the manipulation of the musical paths and other visual information within the 3D animation software is complete (steps 116 and 118 of FIG. 2), the animation is fully rendered on a single or multiple computers (step 120). This produces thousands of individual frames of animation that are then compiled into an MPEG or other video file format (step 122) while maintaining the precise frame-to-beat correspondence established in step 114. At this stage, the video file preparation is complete.

The following steps (steps 124-128) will ensure that the video file is played back in perfect synchronization with a recorded or live musical performance, either through manual synchronization (step 124) or automatic synchronization (steps 126 and 128).

Nothing is more critical to maintaining the intuitive connection between auditory and visual phenomena required to achieve a synaesthetic experience in the listener/viewer than precise synchronization of the visuals with the rhythm of the musical performance. In most performances of complex music, the musicians constantly stretch and compress their tempos for expressive purposes. The musicians are playing exactly what is in the score, but they are doing so with expressive license and a fluid approach to tempo that is more like breathing than clockwork. Step 114 described how the frames-to-beats ratios are set to ensure that a precise number of frames consistently correspond to each beat subdivision found in a particular piece of music. Depending on the situation, either step 124 or steps 126 and 128 are then taken to ensure that the rendered animation is perfectly synchronized with the actual performance.

When synchronizing the video playback to a recorded or live performance manually via step 124, the user manually taps the tempo into the system. This can be accomplished in any reasonable fashion, such as by tapping a key on a keyboard or other tempo input device 14. The tempo input device 14 may be a foot switch so that the user's hands may be free to perform other tasks, such as some of the tasks described below in connection with the second embodiment of the invention, in which the user may manually control the animation during the musical performance. The System provides for tapping at any desired musical sub-division from a whole note to a 16th-note triplet. The user is free to change their tapping to any sub-division during a performance to accommodate the music to which they're synchronizing. For instance, the user can instruct the system to change the taps to correspond to eighth notes rather than quarter notes at any time.

Intelligent tempo control software stored in the memory 28 allows a precise number of frames to play for each beat tapped into the tempo control input device 14. The tempo control software automatically corrects common user errors by, for instance, continuing at a set tempo if the user misses a beat. The tempo control software also tracks the total number of beats that have gone by so that it may track the precise position within the MIDI score and the total number of frames that have gone by based upon the frame-to-beat rates that were set in step 114. This allows the tempo control software to catch up to or jump back to any point in the score when the user enters in the bar number of the measure requested using the computer's general input device 12. The tempo control software is also able to anticipate acceleration or slowing of the tempo based on the user's indication of a pending tempo change so that the auto-correct features that normally help to maintain a steady beat within a predetermined threshold may be temporarily disabled to allow a sudden change of tempo.

In order to synchronize the video playback to a live performance automatically via steps 126 and 128, one first sets up at least one microphone dedicated to each instrumental group that is treated independently in the score so that audio data may be isolated for each group and inputted to the audio input device 16 (step 126). Pitch and rhythm tracking software stored in the memory 28 then compares the actual audio data from the performance to the MIDI score generated in step 104 to determine precisely the measure and beat position of the performance with respect to the score at any time throughout the performance (step 128). Software having suitable pitch and rhythm tracking functionality is used currently in commercially available products such as Karaoke programs that have pitch correction features for indicating when the singer is off-key, audio production software with pitch editing features that can be readily adapted for use in connection with the present invention(such as Digital Performer 4.6 from MOTU), or audio-to-MIDI conversion software (such as Solo Explorer WAV to MIDI software, available from the Recognisoft company). Based on the frames-per-beat rates established in step 114, the pitch and rhythm tracking software allows a set number of frames to pass for every beat that it reads from the performers. The pitch and rhythm tracking software maintains various thresholds that can be set by the user to control limited auto-correcting features that will help ensure that the tracking software does not lose its place in the event that unexpected data comes out of the performance (for instance, if a musician knocks over the stand holding a microphone resulting in a sudden arrhythmic spike in the audio levels on that microphone's channel, the pitch and rhythm tracking software ignores this data spike because it exceeds the tolerance threshold and is therefore dismissed as accidental). However, the pitch and rhythm tracking software's auto-correct features may be disabled or altered to anticipate sudden changes in tempo, volume, or pitch that are indicated in the score. Preferably, the pitch and rhythm tracking software automatically reads ahead in the MIDI score to anticipate such changes and disables or alters its auto-correct thresholds accordingly.

Various permutations of the multi-step process disclosed herein are possible depending on the level of detail desired in the resulting visuals, the time, and/or budget available to complete the visualization process, and whether or not the visuals are to incorporate user-controlled live-input.

For instance, the most nuanced images are achieved when one visualizes not only the raw data embedded within the (x, y) position of the notes in a musical score (x=time; y=pitch) but also the results of a mathematical analysis and interpolation of the raw musical data. Often, such mathematical analysis will reveal complex curves that are embedded within the musical lines, and incorporating these curves into the final visualization can significantly enhance the final results.

Similarly, the visuals resulting from this invention may be pre-rendered using multiple computers in a render farm when one desires the most detailed images possible and budget and/or time constraints are not a concern, but visuals may also be live-rendered from a single computer if budget and/or time constraints prevent the use of multiple pre-rendering computers.

One may also elect to use live-rendering in order to accommodate user-controlled live-input. For instance, the score does not tell us exactly how a particular artist will interpret the notes, timings, and phrasings indicated by the score in any particular performance, but the addition of user-controlled live-input allows the score-based visuals to be expressively shaped by the performing musician(s), a music visualization artist or artists, or automated software. This will allow the visuals to take into account the audio data created by any given score-based performance without losing interpretive elements that have been added by the performer and go beyond the indications of the score.

The decision to use the pre-rendered approach versus the live-rendered approach will necessarily impact the methods used to shape and bend the resulting score-based visuals such that the information extracted from the first step in the process, the analysis of the score, is conveyed in meaningful and intuitive visual form. For instance, if the first step, i.e., analyzing the score, revealed several sequences of rhythmic, melodic, harmonic, and/or orchestrational tension and release or any other musical antecedent/consequent sequence, this information could be used to trigger different 3D animation effects at different points in the score corresponding to those tension and release events. The decision regarding live-rendering versus pre-rendering will necessarily impact the way in which these animation effects are applied. In the case of pre-rendering, the effects would be applied by the animator before the final rendering. In the case of live-rendering, the effects would be triggered from amongst several pre-programmed effect options during a live performance. As an example of one live-rendering embodiment, a simple graphic user interface, or GUI, may be employed that allows a music visualization artist to select from amongst several pre-programmed visual effects and either trigger those effects manually or associate them with the moments of rhythmic, melodic, harmonic, and orchestrational tension and release identified through the analysis step. The results of the music analysis would be indicated visually in the GUI such that the selected visual effects may be triggered automatically when the music reaches the appropriate point in the score.

Similarly, the decision to pre-render or live-render impacts the way in which the resulting score-based visuals are synchronized to the changing tempos of an actual performance. In the case of pre-rendering, the synchronization may be achieved by associating a precise number of frames with a precise beat value or subdivision thereof and employing a user-controlled or automated device that allows a precise number of frames to play for each beat. In the case of live-rendering, one may opt to use a fixed frame rate of, for instance, 30 frames per second, with the synchronization of the resulting visuals to the actual performance achieved through other means. Detailed further below are several options for visualizing score-based music that one may adopt as approaches according to time and/or budget constraints as well as the artistic goals of any particular project.

No matter which options are chosen in developing score-based visualizations, the process involves reducing the music to its component structural parts and assigning visual effects appropriate to each part. As such, the present invention provides a method that may be adapted for a wide range of applications.

Also, no matter which options are chosen in developing score-based visualizations, the process will necessarily employ anticipating what is coming in the score. For instance, analyzing the score's structure necessarily involves looking ahead in the score, far beyond whatever part of the music is playing at any given moment, so that the music's structural elements can be linked to 3D animation effects across long phrases that may take 8, 16, or even 100 measures to realize their tension and release cycles. The process outlined in the present invention takes into account where the music is going before a particular visualization tool is assigned to any given point in the music.

B. 3D Animated Music Visualizations for Improvisational Music Performance (Not Score-Based)

The invention can also be adapted to generate visualizations corresponding to live performances having no predetermined written score. The following is a description of such an embodiment of the invention If the music is improvisational and is performed live, the entire multi-step visualization process must happen virtually instantaneously in real time within a computer system. Again, it relies on analyzing the audio and/or MIDI/electronic information generated by the live performance using all available methods to extract meaningful structural information such as, but not limited to, rhythmic, melodic, harmonic, and orchestrational tension and release structures. The improvisatory nature of the performance may require that predictive modeling be employed to anticipate what is likely to follow any musical phrases that have just been performed by considering the standardized harmonic norms and phrase structures of any particular musical style.

1. Elements of the System

Figure 9:
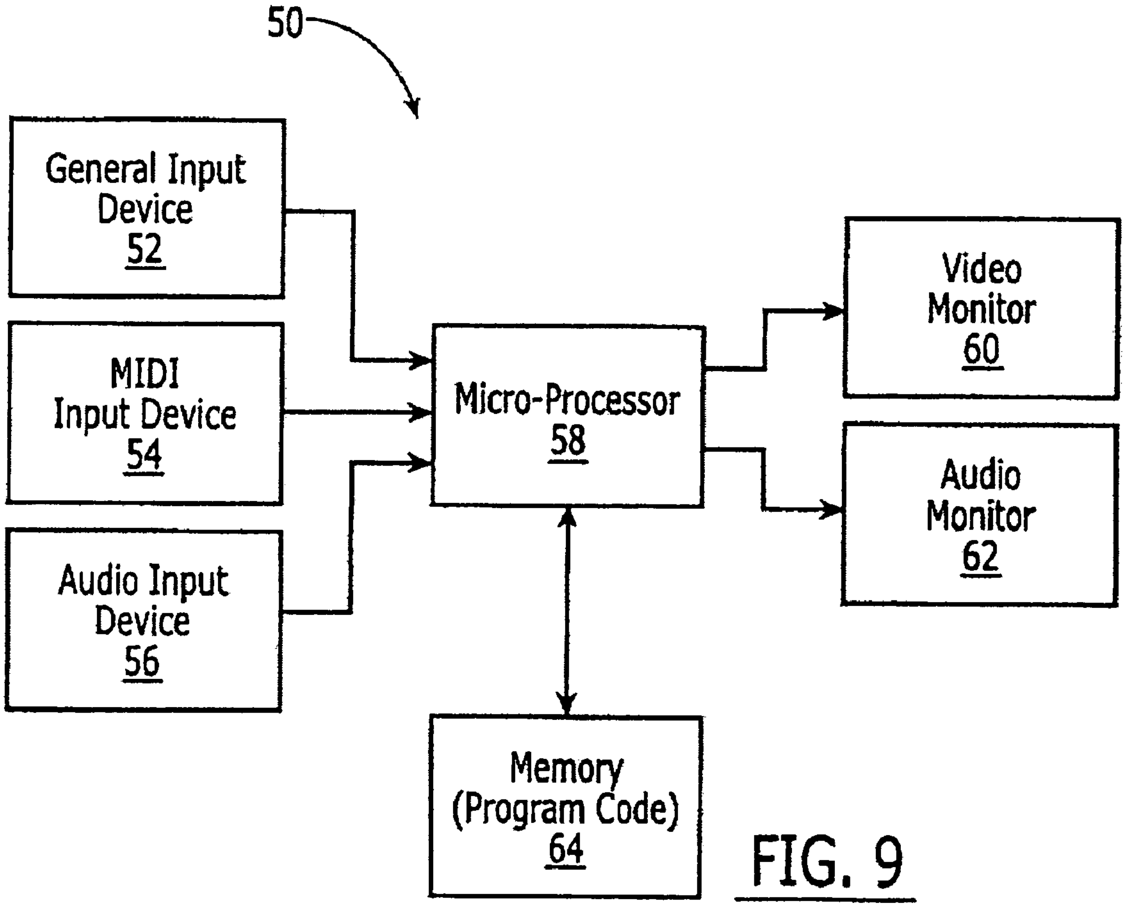
FIG. 9 is a block diagram of a preferred embodiment of a second embodiment of a system in accordance with the principles of the present invention adapted to generate three-dimensional visualizations of a musical performance that is improvisational or does not adhere to a predetermined musical score.

Referring to the drawings, wherein like reference numerals designate like elements throughout the views, and referring in particular to FIG. 9, the system 50 includes a general input device 52, a MIDI input device 54, an audio input device 56, a microprocessor 58, a video monitor 60, an audio monitor 62, and a memory storing programmed code 64 that controls the operation of the microprocessor 58. The general input device 52 may be a typical keyboard, computer mouse, or the like. The MIDI input device 54 may be a MIDI keyboard, guitar, or other MIDI controller or the like. The audio input device 56 may be a microphone or a plurality of microphones positioned to capture and isolate audio data from individual instruments in an ensemble. The microprocessor 58 may be a conventional microprocessor that interfaces with the general input device 52, MIDI input device 54, and audio input device 56 to receive the inputted data. The video monitor 60 may be a standard, flat panel, plasma, or LCD projector display. The audio monitor 62 may be standard headphones or speakers. The memory 64 may be a permanently installed memory, such as a computer hard drive, or a portable storage medium such as a computer disk, external hard drive, USB flash drive, or the like. Stored on the memory 64 may be programmed code including proprietary and currently available ("off-the-shelf") software that, when utilized systematically as described in detail below, can be used to control the microprocessor 58 to effect the transformation of the audio and MIDI data produced by a live musical performance into a digital MIDI file and then to a three-dimensional animation. The images produced on the video monitor 60 may be a three-dimensional representation of the musical score. The entire system 50 may be embodied in a personal computer, laptop computer, handheld computer, or the like.

2. The Preferred Method

Figure 10:
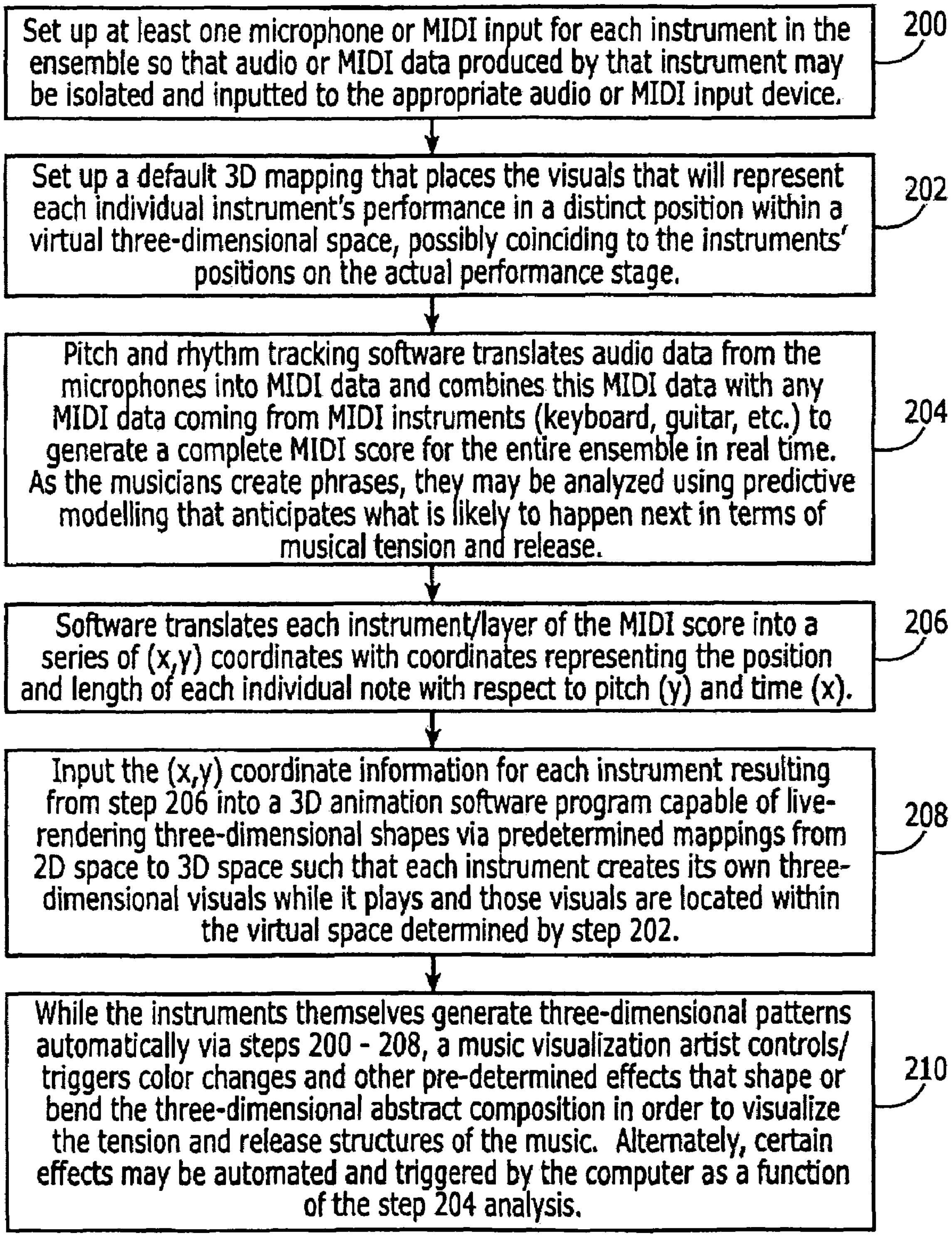
FIG. 10 is a flow chart depicting an embodiment of a method in accordance with the principles of the present invention corresponding to the system of FIG. 9 for generating three-dimensional visualizations of a musical performance that is improvisational or does not adhere to a predetermined musical score.

A flow chart illustrating one preferred method of creating real-time rendered 3D animations synchronized to a live musical performance is shown in FIG. 10. One begins by setting up at least one microphone or MIDI input for each instrument in the ensemble so that audio or MIDI data produced by that instrument is isolated and inputted to the appropriate audio input device 56 or MIDI input device 54. Typically, a live concert involving amplified instruments will already have a mixing board through which all audio signals are routed. Step 200 may be realized by patching into an existing audio mixing board to obtain isolated signals for each individual instrument.

In step 202, one sets up a default 3D mapping that places the visuals that will be generated by each individual instrument in a distinct position within a virtual three-dimensional space. In a live performance with improvisational elements like a rock concert, although predictive modeling can provide some useful insight in real time, one does not have the advantage of complete fore-knowledge of the music before it is played, as in a score-based performance. Thus, the mappings cannot be custom-tailored to each individual harmonic or contrapuntal situation before it occurs, but rather must be more standardized to accommodate a number of possible harmonic and contrapuntal situations. One standardized mapping technique that is easy for the audience to intuitively understand is to project a virtual three-dimensional space above the performance stage and place the individual visuals generated by each instrument (or group of instruments) at distinct locations within the three-dimensional virtual space such that they mirror the positions of the instruments on the actual performance stage below.

In step 204, pitch and rhythm tracking software translates the audio data from the microphones into MIDI data and combines this MIDI data with any MIDI data coming from MIDI instruments to generate a complete MIDI score for the entire ensemble in real-time. Audio-to-MIDI conversion software is readily available, such as Solo Explorer WAV to MIDI conversion software from the Recognisoft company, which can be used in combination with MIDI sequencing software, such as MOTU's Digital Performer 4.6, to complete step 204. The results of the audio-to-MIDI conversion are then analyzed using predictive modeling to identify patterns that are expected within a given style of music such that the likely resolution of a tension-building pattern, for instance, may be anticipated and may inform the visualization. Existing software already incorporates the necessary phrase recognition functionality, such as Daniel Sleator and Davy Temperley's Melisma Music Analyzer available for free download at http://www.link.cs.cmu.edu/music-analysis/.

Once the complete MIDI score has been generated, it is immediately imported into another software program that translates each instrument/layer of the MIDI score into a series of x, y coordinates representing the position and length of each individual note with respect to pitch (y) and time (x) (step 206). Again, MOTU's Digital Performer 4.6 can quickly and easily generate x, y coordinate graphs like those required by step 206.

In step 208, the x, y coordinate information for each instrument resulting from step 206 is inputted to a 3D animation software and/or hardware capable of live-rendering three-dimensional shapes via predetermined mappings from 2D space to 3D space previously set up by the user of the system. The hardware and software technology required for live-rendering 3D animations that are responsive to real-time input is already widely used within commercial video game systems, such as the Nintendo Game Cube, Sony's Play Station 2, and Microsoft's X-Box.

These real-time rendered visuals preserve the precise shape of the melodic lines performed by each musician and extend those forms into three-dimensions using predetermined or flexible mapping algorithms that are either fixed or are informed by the predictive modeling analysis such that each instrument creates its own three-dimensional visuals while it plays and those visuals are located within the virtual space determined by step 202. The musicians are then composing abstract visual animations that are controlled by the notes they play and will illustrate their melodic patterns and interaction with the other instruments visually in real-time.

Step 210 provides for an additional degree of expressive control of the visuals that result from steps 200-208. While the instruments themselves generate three-dimensional patterns automatically via steps 200-208, a music visualization artist (i.e., the "user") may control/trigger color changes and other pre-determined effects that shape or bend the three-dimensional abstract composition in order to visually express the phrases or tension and release structures determined by the analysis. Possible bending and shaping effects include all of those listed in connection with step 116 of the previous section. All of these effects are pre-programmed into the real-time rendering 3D animation software such that they may be easily triggered and/or controlled at any time during the performance, such as by the pressing of a key on the general input device 52. A range of possible MIDI control devices could be connected to the MIDI input device 54 for the purpose of "playing" the visual effects expressively using a MIDI keyboard, breath controller, or other MIDI instrument. For example, the vortex effect previously described as a way to visualize a harmonic V-Pedal (FIG. 7) could be triggered anytime the ensemble is building harmonic tension, with the rate of the spin of the vortex increased or decreased by a MIDI breath controller, and the vortex effect disengaged by the music visualization artist at the precise moment that the ensemble releases the tension they have built.

C. Recording-Based Music Visualization

When the music to be visualized is based only upon a recording and not a predetermined score, referred to throughout this disclosure as "recording-based" music visualization, a multi-step process similar to that used for score-based music is utilized such that, again, the process takes advantage of detailed fore-knowledge of all musical events, with such knowledge provided in this case by the recording rather than a pre-existing score. In the first step of the recording-based process, the recording is analyzed using one or several available systems and software products to extract meaningful structural information such as, but not limited to, points of rhythmic, melodic, harmonic, and orchestrational tension and release. As with score-based visualizations, various permutations of additional steps in a multi-step process are possible depending on the level of detail desired, the time and/or budget available to complete the visualization process, and whether or not the visuals are to incorporate user-controlled live-input.

1. Elements of the System

Figure 11:
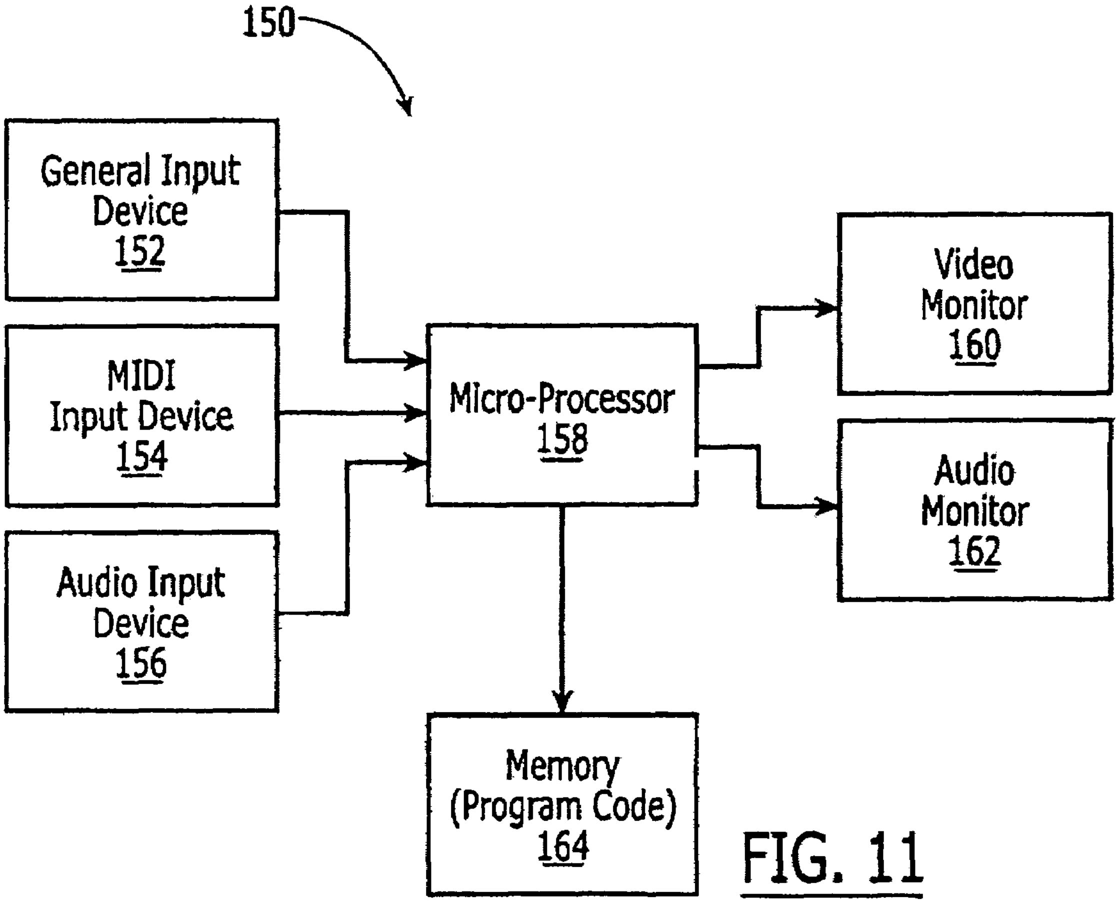
FIG. 11 is a block diagram of a third embodiment of a system in accordance with the principles of the present invention adapted to generate three-dimensional visualizations of a musical performance based upon an audio recording.

Referring to the drawings, wherein like reference numerals designate like elements throughout the views, and referring in particular to FIG. 11, the system 150 includes a general input device 152, a MIDI input device 154, an audio input device 156, a microprocessor 158, a video monitor 160, an audio monitor 162, and a memory storing programmed code 164 that controls the operation of the microprocessor 158. The general input device 152 may be a typical keyboard, computer mouse, or the like. The MIDI input device 154 may be a MIDI keyboard, guitar, or other MIDI controller or the like. The audio input device 156 may be a CD player, MP3 player, or any other device capable of playing music. The microprocessor 158 may be a conventional microprocessor that interfaces with the general input device 152, MIDI input device 154, and audio input device 156 to receive the inputted data. The video monitor 160 may be a standard, flat panel, plasma, or LCD projector display. The audio monitor 162 may be standard headphones or speakers. The memory 164 may be a permanently installed memory, such as a computer hard drive, or a portable storage medium such as a computer disk, external hard drive, USB flash drive, or the like. Stored on the memory 164 may be programmed code including proprietary and currently available ("off-the-shelf") software that, when utilized systematically as described in detail below, can be used to control the microprocessor 158 to effect the transformation of the audio and MIDI data produced by a live musical performance into a digital MIDI file and then to a three-dimensional animation. The images produced on the video monitor 160 may be a three-dimensional representation of the musical score. The entire system 150 may be embodied in a personal computer, laptop computer, handheld computer, or the like.

2. The Preferred Embodiment

Figure 12:
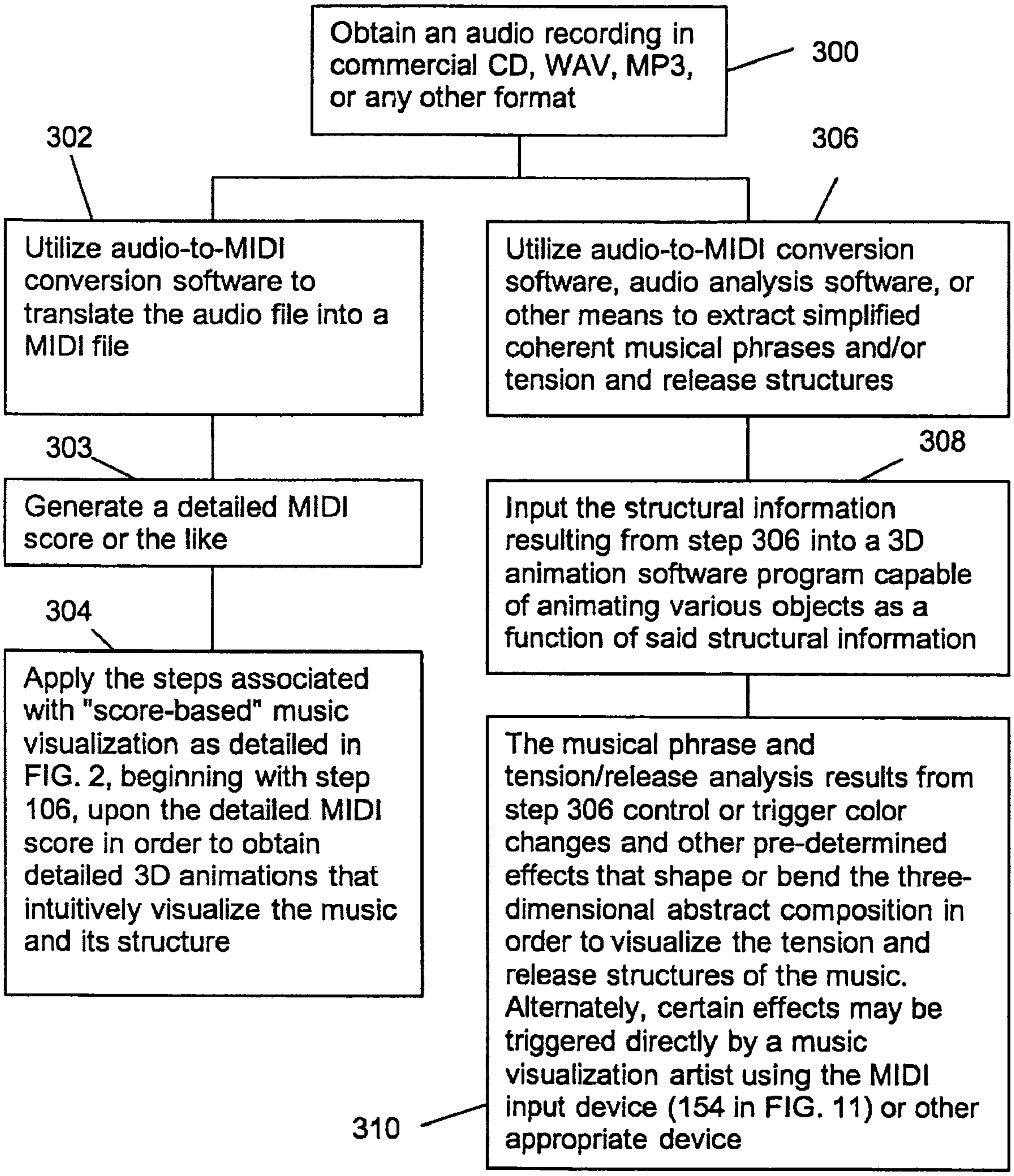
FIG. 12 is a flow chart depicting an embodiment of a method in accordance with the principles of the present invention corresponding to the system of FIG. 11 for generating three-dimensional visualizations of a musical performance based upon an audio recording.

A flow chart illustrating one preferred method of creating real-time rendered 3D animations synchronized to a recorded musical performance is shown in FIG. 12. When budget and/or time constraints are not an issue, one begins by selecting any audio recording (step 300).

Next, one applies detailed audio analysis in order to construct an electronic file that represents all of the information that would normally be present within a traditional paper score, a MIDI electronic score, or another electronic score format (step 302). In this case, the process essentially comprises reverse-engineering a score from the recording. Suitable software for this purpose is readily available. For instance, Solo Explorer WAV to MIDI conversion software, available from Recognisoft, may be used to translate layers of the recording into MIDI tracks, which can then be pieced together into a full MIDI score using MIDI sequencing software such as MOTU's Digital Performer 4.6. In step 303, a detailed MIDI score or the like is generated as described above in connection with the score-based embodiment of the invention. Then, in step 304, all of the steps utilized for score-based music visualization and the various options outlined for score-based music are then applicable for recording-based music, i.e., steps 106 through 128. In effect, the recording-only music has then been transformed into score-based music such that the most nuanced visuals are now possible, following the steps described for score-based music visualization (see FIG. 2).

Alternately, the reverse-engineering of a score for recording-only music may not be practical or necessary in all cases. In some cases, satisfactory visualizations can be generated by simpler means. Particularly, even without complete information about the x, y pitch and time location information for all notes within a recording, one still can create compelling visualizations that go far beyond those currently available by simply ensuring that the movements of objects represented on screen are synchronized to the rhythm of the music. Similarly, even without a complete score, automated analysis of a recording can determine meaningful points of harmonic tension and release such that one may apply swirling vortex or other effects to various abstract objects on screen, with the effects triggered on and off in accordance with the buildup and release of harmonic tension synchronized to the recording playback. In such cases, flow instead proceeds from step 300 to step 306.

In step 306, a MIDI or similar file is created using, for instance, audio-to-MIDI conversion software, audio analysis software, or any other manual or automated process for identifying simple coherent musical phrases within the music, such as, but not limited to, points of rhythmic, melodic, harmonic, and orchestrational tension and release in the musical work). In step 308, the structural information generated in step 306 is imported into a 3D animation program. The 3D animation program may be used to trigger any number of 3D animation effects designed to convey the appropriate tension and release structures within the music in intuitive visual form (step 310). Alternately or additionally in step 310, certain effects may be triggered directly by a music visualization artist using the MIDI input device (154 in FIG. 11) or another appropriate device (step 310).

CONCLUSION

The present invention allows one to create 3D abstract animations that intuitively represent the music they are intended to visualize and are artistically as complex and expressive as the music itself. The primary reason that this invention is successful in this regard is that it draws all of its source data used to generate abstract visuals from the abstract visual relationships embedded in the composer's version of visual music, the score. In math, it is a simple procedure to develop a mapping equation that translates a two-dimensional data set from an x, y coordinate plane into a three-dimensional data set in an x, y, z coordinate plane while maintaining a one-to-one correspondence between the original two-dimensional data set and the new three-dimensional data set created by the mapping equation. The present invention applies this process to the visualization of music by transforming it from the two-dimensional x, y coordinate plane embedded in the score to a three-dimensional x, y, z coordinate plane via various mapping equations that maintain a one-to-one correspondence between the original two-dimensional data set (the score) and the resulting three-dimensional data set. 3D effects are then applied to the resulting abstract objects as a function of the information extracted by a structural analysis of the score.

In the case of the application of the invention to improvisatory performance, the score is still the driving force behind the visualizations because the invention analyzes the audio data from the actual performance to reverse-engineer a MIDI or other electronic version of a score that becomes the basis for visualizations.

While most approaches to music visualization ignore the architecture of the music itself, the present invention was designed to utilize it as much as possible. The resulting synaesthetic combination between the music and the visualization represents a significant advance in music notation, as well as a new art form that has been in artists' imaginations for over one hundred years and can now be realized through today's computer technology.

This invention may also be used with the Internet in connection with popular computer music jukebox programs like Apple I-Tunes and MusicMatch Jukebox. Currently, programs like I-Tunes and MusicMatch Jukebox offer a visualization window that provides primitive visual accompaniment for whatever music happens to be playing at the time. The present invention could replace these primitive visualizations with visualizations built upon the actual architecture of the music. A database of music visualizations for popular score-based musical pieces may be developed such that users of programs like I-Tunes can download visualizations specifically developed for the music they are listening to. I-Tunes already lets its users access a database containing the track names, album titles, and other information to fill in such information on-screen for any consumer CD that is played by the computer. A similar automated system could be used to download pre-rendered music visualizations that could be synchronized to the digital music file's playback.

Alternately, such jukebox programs could be supplied with rendering programs as described above that produce visuals in real-time responsive to the music that are tailored to the audio data in the digital music file.

The preferred embodiments described herein are intended to illustrate only a few possible embodiments of the invention with specific emphasis on an embodiment for performances that follow a score, another embodiment for improvisational performances, and a third embodiment for situations when only an audio recording is available. Other embodiments and modifications will no doubt occur to those skilled in the art of music, 3D animation, mathematical analysis of trajectories and curves, virtual reality simulators and rides, and other existing music visualization techniques. Such alterations, modifications, and improvements as are made obvious by this disclosure are intended to be part of this description though not expressly stated herein, and are intended to be within the spirit and scope of the invention. Thus, the examples given should be interpreted only as illustrations of some of the preferred embodiments of the invention. The invention is limited only as defined in the following claims and equivalents thereto.

The invention claimed is:

1. A method of producing a graphical representation of a musical work comprising a plurality of individual musical lines comprising notes, said method comprising the steps of:

(1) obtaining an electronic version of said musical work;

(2) translating using a processor said notes of each individual musical line of said electronic version into a separate x, y graph in which a y value of said notes is representative of a pitch of said note and an x value is representative of a relative time of said note in said musical work and a duration of said note;

(3) importing using said processor each said graph into three-dimensional animation software;

(4) generating using said processor a visual object corresponding to each individual musical line of said musical work; and (5) applying using said processor at least one three-dimensional animation technique to each said object, said animation technique being a function of said corresponding graph.

2. The method of claim 1 further comprising the step of:

(6) displaying said object using a visual display device.

3. The method of claim 2 further comprising the steps of:

(7) for each graph, generating a smooth mathematical function representative of a curve traced by said graph; and (8) importing said smooth mathematical function and said graph into three-dimensional animation software;

wherein said animation technique a function of said mathematical function.

4. The method of claim 3 wherein step (7) comprises generating a piece wise smooth linear function that has a finite derivative at all points.

5. The method of claim 2 wherein there is a one-to-one correspondence between the animation and the music such that a written traditional musical score can be derived from the animation.

6. The method of claim 2 wherein step (1) comprises converting a standard musical score into a MIDI score.

7. The method of claim 6 wherein step (2) comprises generating a MIDI graph of said musical work.

8. The method of claim 2 wherein step (1) comprises:

(1.1) receiving an audible musical composition;

(1.2) converting said audible musical composition into said electronic version in real time.

9. The method of claim 2 wherein each said object is assigned to a different position within a virtual three-dimensional space.

10. The method of claim 9 wherein the relative positions of said objects in said virtual three-dimensional space correspond to the relative positions of instruments in an musical ensemble producing the musical lines corresponding to said objects.

11. The method of claim 2 wherein step (5) comprises depicting an object for each individual musical line in said musical work, each said object assigned to a different position within a virtual three-dimensional space.

12. The method of claim 11 wherein the relative positions of said objects in said virtual three-dimensional space correspond to the relative positions of instruments in a musical ensemble producing the musical lines corresponding to said objects.

13. A method of producing a graphical representation of a musical work comprising a plurality of notes, said method comprising the steps of:

(1) obtaining an electronic version of said musical work;

(2) translating using a processor said notes of said electronic version into an x, y graph in which a y value of said notes is representative of a pitch of said note and said x value is representative of a relative time of said note in said musical work and a duration of said note;

(3) importing using said processor said graph into three-dimensional animation software;

(4) selecting using said processor a frame rate, said frame rate being a number of frames per musical time unit in said musical work;

(5) providing to said animation software a tempo of said musical work;

(6) synchronizing said frame rate to said tempo;

(7) generating using said processor a visual object; and (8) applying using said processor at least one three-dimensional animation technique to said object, said animation technique being a function of said graph.

14. The method of claim 13 further comprising the step of:

(9) displaying said object using a visual display device.

15. The method of claim 14 further comprising the step of:

(10) generating using said processor a smooth mathematical function representative of a curve traced by said graph; and wherein, in step (8), said animation technique is a function of said smooth mathematical function.

16. The method of claim 14 wherein step (4) comprises selecting a frame rate such that every note in said musical work corresponds to an integer number of frames.

17. The method of claim 16 wherein said musical time unit is a quarter note of said musical work.

18. The method of claim 14 wherein step (5) comprises a user manually providing said tempo to said animation software.

19. The method of claim 18 wherein step (5) comprises said user activating an input device in temporal correspondence with said tempo of said musical piece.

20. The method of claim 19 wherein step (6) further comprises automatically correcting for a missed activation by said user.

21. The method of claim 20 further comprising the step of:

(11) permitting said user to disable said automatic correction in step (6), whereby said automatic correction will not interfere with a sudden tempo change in said musical work.

22. The method of claim 14 wherein step (5) comprises:

(5.1) inputting said musical work via a digital audio input to automatic pitch and rhythm tracking software; and (5.2) using said automatic pitch and rhythm tracking software to determine said tempo.

23. The method of claim 22 wherein step (5.1) comprises inputting each melodic line of said musical work via a separate digital audio input.

24. A method of producing a graphical representation of a musical work comprising a plurality of individual musical lines comprising notes, said method comprising the steps of:

(1) obtaining an electronic version of said musical work;

(2) translating said notes of each individual musical line of said electronic version into a separate x, y graph in which a y value of said notes is representative of a pitch of said note and an x value is representative of a relative time of said note in said musical work and a duration of said note;

(3) analyzing said electronic version of said musical work to identify discrete coherent musical phrases within said work;

(4) importing using a processor each said graph into three-dimensional animation software; and (5) generating using said processor a visual display depicting an object for each individual music line and applying at least one three-dimensional animation technique to said object, at least one of each said object and said animation technique being a function of said graph and said musical phrases.

25. The method of claim 24 further comprising the step of:

(6) displaying said object using a visual display device.

26. The method of claim 25 wherein said musical phrases are at least one of keys, musical tension/release sequences, musical themes, and musical antecedent/consequent sequences.

27. The method of claim 25 wherein there is a one-to-one correspondence between the animation and the music such that a written traditional musical score can be derived from the animation.

28. The method of claim 25 wherein step (1) comprises converting a standard musical score into a MIDI score.

29. The method of claim 28 wherein step (2) comprises generating a MIDI graph.

30. The method of claim 25 wherein each said object is assigned to a different position within a virtual three-dimensional space.

31. The method of claim 30 wherein the relative positions of said objects in said virtual three-dimensional space correspond to the relative positions of instruments in a musical ensemble producing the melodic lines corresponding to said objects.

32. The method of claim 25 further comprising the steps of:

(6) generating a smooth mathematical function representative of a curve traced by said graph; and (7) importing said smooth mathematical function into said three-dimensional animation software.

33. The method of claim 32 wherein, in step (5), at least one of said object and said animation technique is further a function of said mathematical function.

* * * * *

UNITED STATES PATENT AND TRADEMARK OFFICE

CERTIFICATE OF CORRECTION

PATENT NO. : 7,589,727 B2
APPLICATION NO. : 11/334029
DATED : September 15, 2009
INVENTOR(S) : Eric P. Haeker It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 576 days.

Signed and Sealed this

Twenty-first Day of September, 2010

David J. Kappos

*Director of the United States Patent and Trademark Office*